(12) United States Patent
Satpathy et al.

(10) Patent No.: US 12,299,183 B1
(45) Date of Patent: May 13, 2025

(54) TAMPER DETECTION AND PREVENTION IN COMPUTER SYSTEMS HAVING ONE-TIME PROGRAMMABLE MEMORY

(71) Applicant: Meta Platforms Technologies, LLC, Menlo Park, CA (US)

(72) Inventors: Sudhir Satpathy, Redmond, WA (US); Wojciech Stefan Powiertowski, Kirkland, WA (US); Nagendra Gupta Modadugu, San Francisco, CA (US); Neeraj Upasani, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 221 days.

(21) Appl. No.: 17/301,274

(22) Filed: Mar. 30, 2021

Related U.S. Application Data

(60) Provisional application No. 63/133,174, filed on Dec. 31, 2020.

(51) Int. Cl.
*G06F 21/79* (2013.01)
*G06F 15/78* (2006.01)
*G06F 21/31* (2013.01)
*G06F 21/55* (2013.01)
*G06F 21/60* (2013.01)
*G11C 29/32* (2006.01)
*G11C 29/52* (2006.01)

(52) U.S. Cl.
CPC .......... *G06F 21/79* (2013.01); *G06F 15/7807* (2013.01); *G06F 21/31* (2013.01); *G06F 21/554* (2013.01); *G06F 21/602* (2013.01); *G11C 29/32* (2013.01); *G11C 29/52* (2013.01)

(58) Field of Classification Search
None
See application file for complete search history.

(56) References Cited

U.S. PATENT DOCUMENTS

| 5,991,519 A | * | 11/1999 | Benhammou | ........ G06Q 20/341 340/5.74 |
| 9,583,210 B1 | * | 2/2017 | Berger | ................... G11C 17/16 |

(Continued)

FOREIGN PATENT DOCUMENTS

| EP | 1383135 A2 | * | 1/2004 | .......... G06F 11/1008 |
| EP | 1640844 A1 | * | 3/2006 | ............. G06F 21/79 |

(Continued)

OTHER PUBLICATIONS

Lemay, M., Gunter, C.A. (2015). Network-on-Chip Firewall: Countering Defective and Malicious System-on-Chip Hardware. In: Logic, Rewriting, and Concurrency. Lecture Notes in Computer Science(), vol. 9200. Springer, Cham. https://doi.org/10.1007/978-3-319-23165-5_19.*

(Continued)

*Primary Examiner* — Syed A Zaidi
*Assistant Examiner* — Vadim Savenkov
(74) *Attorney, Agent, or Firm* — Greenberg Traurig, LLP

(57) ABSTRACT

This disclosure describes systems on a chip (SOCs) that prevent trim attempts. The SOCs include one-time programmable (OTP) memory and an engine configured to determine if the one-time programmable (OTP) memory has been trimmed; and if the one-time programmable (OTP) memory has been trimmed, to prevent trimming of the OTP memory.

21 Claims, 17 Drawing Sheets

(56) References Cited

U.S. PATENT DOCUMENTS

| | | | |
|---|---|---|---|
| 9,640,278 B1* | 5/2017 | Xi | G11C 11/4096 |
| 10,901,627 B1* | 1/2021 | Bshara | G06F 9/45558 |
| 11,114,176 B1* | 9/2021 | Lee | G11C 17/16 |
| 11,250,135 B1* | 2/2022 | Zhang | G06F 21/44 |
| 2006/0129747 A1* | 6/2006 | Weber | G06F 21/78 |
| | | | 711/100 |
| 2006/0131743 A1* | 6/2006 | Erickson | G06F 21/71 |
| | | | 257/737 |
| 2007/0051804 A1* | 3/2007 | Anderson | G07C 13/00 |
| | | | 235/386 |
| 2008/0061817 A1* | 3/2008 | Erickson | G06F 30/34 |
| | | | 326/8 |
| 2012/0210115 A1* | 8/2012 | Park | H04L 9/3247 |
| | | | 713/2 |
| 2013/0187706 A1* | 7/2013 | Hebig | G11C 17/18 |
| | | | 716/100 |
| 2014/0108876 A1* | 4/2014 | Pathak | G01R 31/318588 |
| | | | 714/E11.155 |
| 2015/0254189 A1* | 9/2015 | Coppola | G06F 9/45533 |
| | | | 711/163 |
| 2016/0028728 A1* | 1/2016 | Hampel | H04L 9/3234 |
| | | | 713/181 |
| 2016/0099078 A1* | 4/2016 | Luo | G11C 29/46 |
| | | | 365/201 |
| 2017/0046514 A1* | 2/2017 | Henry | H04L 9/0643 |
| 2018/0061780 A1* | 3/2018 | Arora | G06F 21/87 |
| 2018/0189493 A1* | 7/2018 | Schilder | G01R 31/318588 |
| 2018/0288364 A1* | 10/2018 | Virhia | G11B 27/34 |
| 2018/0357012 A1* | 12/2018 | Colombo | G06F 15/177 |
| 2019/0129892 A1* | 5/2019 | Sinanoglu | G06F 21/00 |
| 2020/0043563 A1* | 2/2020 | Galinski | G11C 29/027 |
| 2020/0082887 A1* | 3/2020 | Cadloni | G06F 12/0253 |
| 2020/0183804 A1* | 6/2020 | Chen | G06F 11/27 |
| 2020/0210105 A1* | 7/2020 | Rori | G11C 29/028 |
| 2020/0358620 A1* | 11/2020 | Kim | H04L 9/3242 |
| 2021/0011556 A1 | 1/2021 | Atlas et al. | |
| 2021/0099283 A1* | 4/2021 | Schvey | G06F 9/45508 |
| 2021/0183463 A1* | 6/2021 | Cowles | G11C 29/50 |
| 2021/0312057 A1* | 10/2021 | Kloth | G06F 3/0623 |
| 2022/0014180 A1* | 1/2022 | Shlomo | G11C 16/30 |
| 2022/0022030 A1* | 1/2022 | Kumar | H04L 63/0442 |
| 2022/0269825 A1* | 8/2022 | Stratan | G06F 21/31 |

FOREIGN PATENT DOCUMENTS

| | | | | |
|---|---|---|---|---|
| EP | 2043324 A1 * | 4/2009 | | G06F 21/85 |
| EP | 3156772 A1 * | 4/2017 | | G01J 1/08 |
| EP | 2519952 B1 * | 6/2017 | | G11C 17/16 |
| WO | WO-2013179091 A1 * | 12/2013 | | G06F 13/16 |
| WO | WO-2017125144 A1 * | 7/2017 | | G06K 19/07 |

OTHER PUBLICATIONS

G. Kornaros, O. Tomoutzoglou and M. Coppola, "Hardware-Assisted Security in Electronic Control Units: Secure Automotive Communications by Utilizing One-Time-Programmable Network on Chip and Firewalls," in IEEE Micro, vol. 38, No. 5, pp. 63-74, Sep./Oct. 2018, doi: 10.1109/MM.2018.053631143.*

M. D. Grammatikakis et al., "Security in MPSoCs: A Noc Firewall and an Evaluation Framework," in IEEE Transactions on Computer-Aided Design of Integrated Circuits and Systems, vol. 34, No. 8, pp. 1344-1357, Aug. 2015, doi: 10.1109/TCAD.2015.2448684.*

Toledo, J., et al. "Design of embedded augmented reality systems." Augmented reality (2010).*

* cited by examiner

US 12,299,183 B1

TAMPER DETECTION AND PREVENTION IN COMPUTER SYSTEMS HAVING ONE-TIME PROGRAMMABLE MEMORY

This application claims the benefit of U.S. Provisional Application No. 63/133,174, which was filed on Dec. 31, 2020 and which the entire contents thereof is incorporated herein by reference.

TECHNICAL FIELD

This disclosure generally relates to tamper detection and prevention in various types of computing systems.

BACKGROUND

Many computing systems incorporate on-chip processing systems in which processors and programmable memories reside on the same chip. In many such systems, the on-chip programmable memory includes one-time programmable (OTP) memory. The one-time programmable memory may be used, for example, to store information used to configure the computing system. Artificial reality systems are one example of computing systems that incorporate one-time programmable memory in this way.

Artificial reality is a form of reality that has been adjusted in some manner before presentation to a user, which may include, e.g., a virtual reality, an augmented reality, a mixed reality, a hybrid reality, or some combination and/or derivatives thereof. Artificial reality systems include one or more devices for rendering and displaying content to users. Examples of artificial reality systems may incorporate a head-mounted display (HMD) worn by a user and configured to output artificial reality content to the user. In some examples, the HMD may be coupled (e.g., wirelessly or in tethered fashion) to a peripheral device that performs one or more artificial reality-related functions.

SUMMARY

As noted above, OTP memory is used in computing systems such as artificial reality systems to store information used to configure the computing system. The information stored in the OTP memory may be proprietary or confidential; it may be necessary to prevent hostile attempts to access the OTP memory.

In addition, some OTP memory may require trimming and/or calibration to compensate for processing differences between integrated circuits. Samsung OTP macros, for instance, may require adjustments to internal bandgap references or to charge-pump circuits to ensure reliable read/write operations. In some example approaches, OTP macros are trimmed by writing bits to appropriate trimming registers within the OTP macro. Device ports in the integrated circuit may be used to enable this initial trimming but to also prevent unintended access or secret tampering (e.g., read out or modification) during mission mode operation.

Furthermore, OTP memory may sometimes be used to host third party secrets, such as, for example, High-bandwidth Digital Content Protection (HDCP) transmitter configuration information and Digital Rights Management (DRM) keys. As such, an OTP memory may be configured to pass an external certification that such information will be protected.

In general, artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

As described herein, typical artificial reality systems include one or more devices for rendering and displaying content to users. Some artificial reality systems incorporate a head-mounted display (HMD) and a peripheral device that are communicatively coupled and function as co-processing devices within the artificial reality system. The HMD is typically worn by a user and configured to output artificial reality content to the user. The peripheral device typically has a form factor like that of a handheld mobile computing device, such as a smartphone or personal digital assistant (PDA). Artificial reality content may represent completely generated content, or a combination of generated content with captured content (e.g., real-world video and/or images).

For portability and other reasons, user-facing artificial reality modalities (e.g., HMDs) and co-processing devices (e.g., peripheral devices in communication with HMDs) are battery-powered and are therefore often designed for low-power operation. The low-power designs and portable form factors make such devices particularly vulnerable to fault injection attacks (FIAs), which can often be performed using non- or semi-invasive voltage, frequency, or temperature manipulation to create artificial variances in the clock signal.

In general, this disclosure describes computing systems that include one or more techniques for detecting whether an OTP memory has been programmed and for preventing access to the OTP memory after the one-time programmable memory has been programmed. In one example approach, the computing systems include OTP memory and an engine configured to prevent hostile attempts to access the OTP memory outside a permitted life cycle.

In one example approach, the computing system includes OTP memory and an engine configured to trim or calibrate the OTP memory and to prevent subsequent attempts to trim or calibrate the OTP memory. In one such example approach, the engine is configured to permit trimming and calibration of internal band-gap reference and charge-pump circuits during an initialization phase while locking out such operation during other phases, such as, for example, during mission mode operation or in any phase outside the initialization phase.

In one example, this disclosure describes a system includes a one-time programmable (OTP) memory; a security controller connected to the OTP memory; and a memory having instructions that, when executed by the security controller, prevent access to the OTP memory, wherein the instructions include instructions that, when executed by the security controller, cause the security controller to detect if the OTP memory is trimmed and, if trimmed, to prevent execution of a request to modify the trimmed OTP memory.

In another example, this disclosure describes an artificial reality device having an application engine; and a system on a chip (SoC) connected to the application engine, wherein the SoC includes a one-time programmable (OTP) memory; a security controller connected to the OTP memory; and a memory having instructions that, when executed by the security controller, prevent access the OTP memory, wherein the instructions include instructions that, when executed by the security controller, cause the security controller to detect if the OTP memory is trimmed and, if trimmed, to prevent execution of a request to modify the trimmed OTP memory.

In yet another example, this disclosure describes an artificial reality system having a head mounted display (HMD) and a peripheral device communicatively coupled to the HMD. The HMD includes an application engine; and an HMD system on a chip (SoC) connected to the application engine, wherein the HMD SoC includes a one-time programmable (OTP) memory; a security controller connected to the OTP memory; and a memory having instructions that, when executed by the security controller, prevent hostile attempts to access the OTP memory, wherein the instructions include instructions that, when executed by the security controller, cause the security controller to detect if the OTP memory is trimmed and, if trimmed, to prevent execution of requests to modify the trimmed OTP memory. The peripheral device includes an application engine; and a peripheral device system on a chip (SoC) connected to the application engine, wherein the peripheral device SoC includes a one-time programmable (OTP) memory; a security controller connected to the OTP memory; and a memory having instructions that, when executed by the security controller, prevent access the OTP memory, wherein the instructions include instructions that, when executed by the security controller, cause the security controller to detect if the OTP memory is trimmed and, if trimmed, to prevent execution of a request to modify the trimmed OTP memory.

In yet another example, this disclosure describes a method including accessing a one-time programmable (OTP) memory; determining if the one-time programmable (OTP) memory has been trimmed; and if the one-time programmable (OTP) memory has been trimmed, preventing trimming of the OTP memory.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Typical artificial reality systems include one or more devices for rendering and displaying content to users. As one example, a multi-device artificial reality system of this disclosure may include a head-mounted device (HMD) worn by a user and configured to output artificial reality content to the user, and a peripheral device that operates as a co-processing device when paired with the HMD. The artificial reality content may include completely generated content or generated content combined with captured content (e.g., real-world video and/or real-world images). The peripheral device and the HMD may each include one or more SoC integrated circuits (referred to herein simply as "SoCs") that are collectively configured to provide an artificial reality application execution environment.

Typical artificial reality systems include one or more devices for rendering and displaying content to users. As one example, an artificial reality system may incorporate an HMD worn by a user and configured to output artificial reality content to the user. In some artificial reality systems, the HMD is communicatively coupled to a peripheral device, which may, in some examples, have a form factor like those of common handheld devices, such as a smartphone. The artificial reality content may include completely generated content or generated content combined with captured content (e.g., real-world video and/or real-world images). Many components of artificial reality systems, such as HMDs and peripheral devices, are battery powered. In these examples, HMDs and peripheral devices tend to be designed for low-power operation. The low-power designs and portable nature of HMDs and peripheral devices make HMDs and peripheral devices particularly vulnerable to Side Channel Attacks (SCAs). SCAs are often performed using non-invasive, accessible, and relatively cheap off-the-shelf hacking equipment, such as SCA boards, trace analysis software, etc.

Programmable hardware, such as an OTP memory, stores instructions for execution by a microprocessor (also referred to herein as a "processor" or "processing circuitry") to, e.g., bootstrap an operating system for a computing device, such as an augmented reality (AR) HMD. It is important to ensure that the OTP memory is secure to prevent unauthorized tampering, such as execution of unauthorized code. However, encrypting or hashing the instructions stored in the ROM is computationally complex, power intensive, and may add noticeable latency to execution of the instructions by the microprocessor. Instead, in accordance with some example techniques of the disclosure, a security controller for an SoC includes hardware which prevents unwanted access to OTP memory.

Figure 1A:
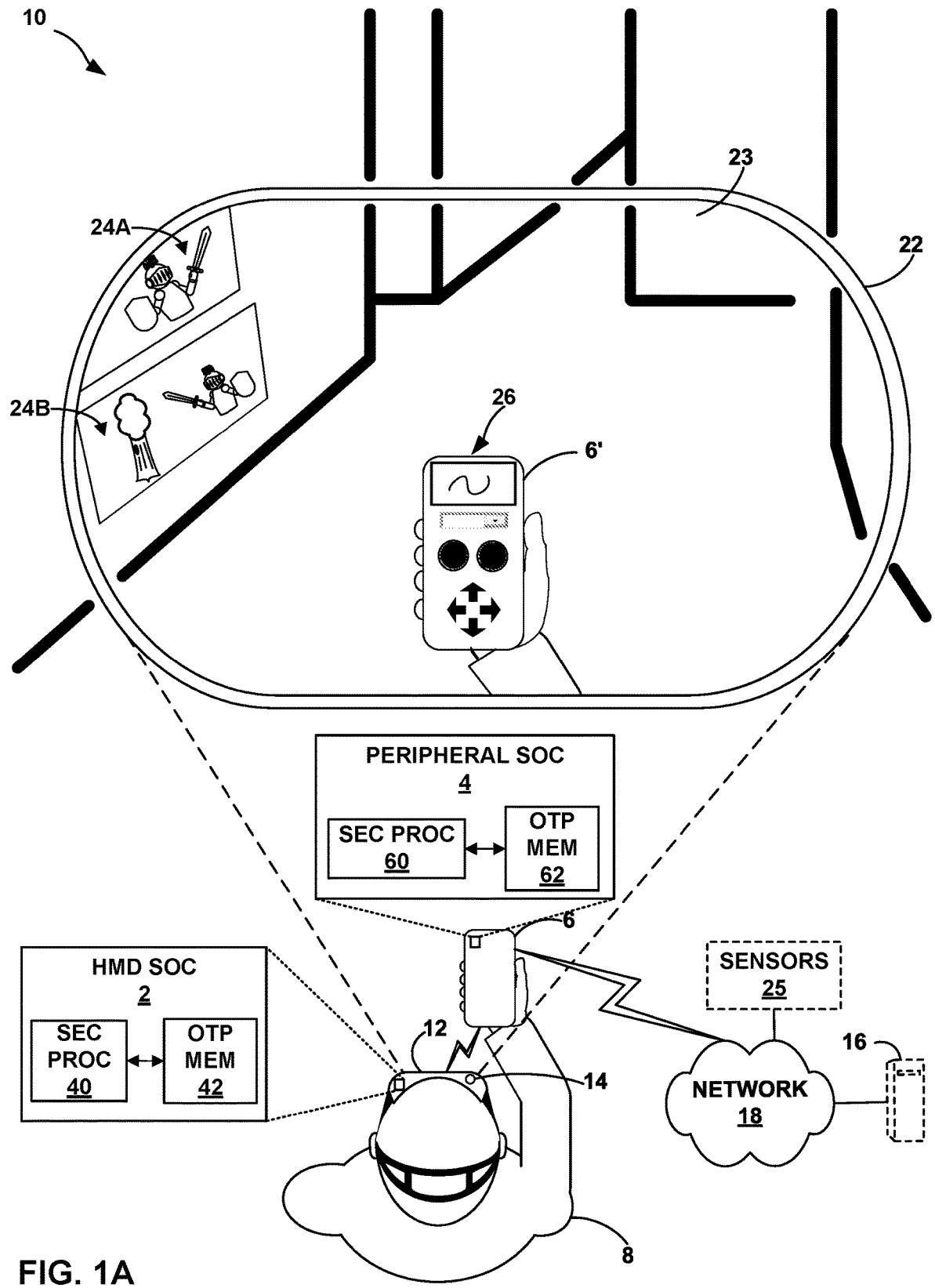
FIG. 1A is an illustration depicting an example multi-device artificial reality system, components of which are configured to prevent unwanted access to OTP memory, in accordance with aspects of this disclosure.

FIG. 1A is an illustration depicting an example multi-device artificial reality system 10, components of which are configured to prevent unwanted access to OTP memory in accordance with aspects of this disclosure. In the example of FIG. 1A, multi-device artificial reality system 10 includes a head-mounted device (HMD) 12 and a peripheral device 6. As shown, HMD 12 is typically worn by a user 8. HMD 12 typically includes an electronic display and optical assembly for presenting artificial reality content 22 to user 8. In addition, HMD 12 includes one or more sensors (e.g., accelerometers) for tracking motion of HMD 12. HMD 12 may include one or more image capture devices 14, e.g., cameras, line scanners, fundal photography hardware, or the like. Image capture devices 14 may be configured for capturing image data of the surrounding physical environment. In some examples, image capture devices 14 include inward-facing camera hardware and/or scanning hardware configured to capture facial images, retina scans, iris scans, etc. of user 8 for user authentication and for other purposes.

HMD 12 is shown in this example as being in communication with (e.g., in wireless communication with or tethered to) peripheral device 6. Peripheral device 6 represents a co-processing device in communication with HMD 12. HMD 12 and/or peripheral device 6 may execute an artificial reality application to construct artificial reality content 22 for display to user 8. For example, HMD 12 and/or peripheral device 6 may construct the artificial reality content based on tracking pose information and computing pose information for a frame of reference, typically a viewing perspective of HMD 12.

As shown in FIG. 1A, one or more devices of multi-device artificial reality system 10 may be connected to a computing network, such as network 18. Network 18 may incorporate a wired network and/or wireless network, such as a local area network (LAN), a wide area network (WAN), a Wi-Fi™ based network or 5G network, an Ethernet® network, a mesh network, a short-range wireless (e.g., Bluetooth®) communication medium, and/or various other computer interconnectivity infrastructures and standards. Network 18 may support various levels of network access, such as to public networks (e.g., the Internet), to private networks (e.g., as may be implemented by educational institutions, enterprises, governmental agencies, etc.), or private networks implemented using the infrastructure of a public network (e.g., a virtual private network or "VPN" that is tunneled over the Internet).

FIG. 1A also illustrates various optional devices that may be included in multi-device artificial reality system 10 or coupled to multi-device artificial reality system 10 via network 18. The optional nature of these devices is shown in FIG. 1A by way of dashed-line borders. One example of an optional device shown in FIG. 1A is console 16. In implementations that include console 16, console 16 may communicate directly with HMD 12, and/or with peripheral device 6 (and thereby, indirectly with HMD 12) to process artificial reality content that HMD 12 outputs to user 8. Another example of optional hardware shown in FIG. 1A is represented by external sensors 25. Multi-device artificial reality system 10 may use external sensors 25 and/or external camera hardware to capture three-dimensional (3D) information within the real-world, physical environment at which user 8 is positioned.

In general, multi-device artificial reality system 10 uses information captured from a real-world, 3D physical environment to render artificial reality content 22 for display to user 8. In the example of FIG. 1A, user 8 views the artificial reality content 22 constructed and rendered by an artificial reality application executing on the combination of HMD 12 and/or peripheral device 6. In some examples, artificial reality content 22 may comprise a combination of real-world imagery (e.g., peripheral device 6 in the form of peripheral device representation 6', representations of walls at the physical environment at which user 8 is presently positioned, a representation of the hand with which user 8 holds peripheral device 6, etc.) overlaid with virtual objects (e.g., virtual content items 24A and 24B, virtual user interface 26, etc.) to produce an augmented reality experience or a mixed reality experience displayed to user 8 via display hardware of HMD 12.

In some examples, virtual content items 24A and 24B (collectively, virtual content items 24) may be mapped to a particular position within artificial reality content 22. As examples, virtual content items 24 may be pinned, locked, or placed to/at certain position(s) within artificial reality content 22. A position for a virtual content item may be fixed, as relative to one of the walls of the real-world imagery reproduced in artificial reality content 22, or to the earth, as examples. A position for a virtual content item may be variable, as relative to peripheral device representation 6' or to the tracked gaze or field of view (FoV) of user 8, as non-limiting examples. In some examples, the position of a virtual content item within artificial reality content 22 is associated with a position within the real-world, physical environment (e.g., on a surface of a physical object) at which user 8 is positioned presently.

In this example, peripheral device 6 is a physical, real-world device having a surface on which the artificial reality application executing on computing platforms of multi-device artificial reality system 10 overlays virtual user interface 26. Peripheral device 6 may include one or more presence-sensitive surfaces for detecting user inputs by detecting a presence of one or more objects (e.g., fingers, stylus) touching or hovering over locations of the presence-sensitive surface. In some examples, peripheral device 6 may include one or more output devices, such as a display integrated into the presence-sensitive surface to form an input/output (I/O) component of peripheral device 6.

In some examples, peripheral device 6 may have the form factor of various portable devices, such as a smartphone, a tablet computer, personal digital assistant (PDA), or other handheld device. In other examples, peripheral device 6 may have the form factor of various wearable devices, such as a so-called "smartwatch," "smart ring," or other wearable device. In some examples, peripheral device 6 may be part of a kiosk or other stationary or mobile system. While described above as integrating display hardware, peripheral device 6 need not include display hardware in all implementations.

In the example artificial reality experience shown in FIG. 1A, virtual content items 24 are mapped to positions on a visual representation of a wall of the real-world physical environment at which user 8 is positioned. The example in FIG. 1A also shows that virtual content items 24 partially appear on the visual representation of the wall only within artificial reality content 22, illustrating that virtual content items 24 do not represent any items that exist in the real-world, physical environment at which user 8 is positioned. Virtual user interface 26 is mapped to a surface of peripheral device 6 as represented in peripheral device representation 6'. Multi-device artificial reality system 10 renders virtual user interface 26 for display via HMD 12 as part of artificial reality content 22, at a user interface position that is locked relative to the position of a particular surface of peripheral device 6.

FIG. 1A shows that virtual user interface 26 appears overlaid on peripheral device representation 6' (and therefore, only within artificial reality content 22), illustrating that the virtual content represented in virtual user interface 26 does not exist in the real-world, physical environment at which user 8 is positioned. Multi-device artificial reality system 10 may render one or more virtual content items in response to a determination that at least a portion of the location of virtual content items is in the FoV of user 8. For example, multi-device artificial reality system 10 may render virtual user interface 26 on peripheral device 6 only if peripheral device 6 is within the FoV of user 8.

During operation, the artificial reality application constructs artificial reality content 22 for display to user 8 by tracking and computing pose information for a frame of reference, typically a viewing perspective of HMD 12. Using HMD 12 as a frame of reference and based on a current field of view 23 as determined by a current estimated pose of HMD 12, the artificial reality application renders 3D artificial reality content which, in some examples, may be overlaid, at least in part, upon the real-world, 3D physical environment of user 8. During this process, the artificial reality application uses sensed data received from HMD 12, such as movement information and user commands, and, in some examples, data from any external sensors 25, such as external cameras, to capture 3D information within the real world, physical environment, such as motion by user 8 and/or feature tracking information with respect to user 8. Based on the sensed data, the artificial reality application determines a current pose for the frame of reference of HMD 12 and, in accordance with the current pose, renders the artificial reality content 22.

Artificial reality system 10 may trigger generation and rendering of virtual content items based on a current field of view of user 8, as may be determined by real-time gaze tracking of the user, or other conditions. More specifically, image capture devices of HMD 12 capture image data representative of objects in the real-world, physical environment that are within a field of view of user 8. Field of view typically corresponds with the viewing perspective of HMD 12. In some examples, the artificial reality application presents artificial reality content 22 comprising mixed reality and/or augmented reality. As illustrated in FIG. 1, the artificial reality application may render images of real-world objects that are within the field of view of user 8 along the virtual objects, such as within artificial reality content 22. In other examples, the artificial reality application may render virtual representations of the objects that are within the field of view (e.g., render real-world objects as virtual objects) within artificial reality content 22. In either example, user 8 can view portions of their hand, arm, peripheral device 6 and/or any other real-world objects that are within the field of view of user 8 within artificial reality content 22.

During operation, artificial reality system 10 may perform object recognition within image data captured by image capture devices of HMD 12 to identify objects within the field of view of user 8. Further, artificial reality system 10 may track the position, orientation, and configuration of peripheral device 6 or of other objects over a sliding window of time. In some examples, peripheral device 6 includes one or more sensors (e.g., accelerometers) for tracking motion or orientation of the peripheral device 6.

Various devices of multi-device artificial reality system 10 may operate in conjunction in the artificial reality environment, such that each device may be a separate physical electronic device and/or separate integrated circuits within one or more physical devices. In this example, peripheral device 6 is operationally paired with HMD 12 to jointly operate to provide an artificial reality experience. For example, peripheral device 6 and HMD 12 may communicate with each other as co-processing devices. As one example, when a user performs a user interface-triggering gesture in the virtual environment at a location that corresponds to one of the virtual user interface elements of virtual user interface 26 overlaid on peripheral device representation 6', multi-device artificial reality system 10 detects the user interface and performs an action that is rendered and displayed via HMD 12.

Each of peripheral device 6 and HMD 12 may include one or more SoC integrated circuits configured to support aspects of the artificial reality application described above, such as SoCs operating as co-application processors, encryption engines, decryption engines, sensor aggregators, display controllers, etc. Although each of peripheral device 6 and HMD 12 may include multiple SoCs, FIG. 1A only illustrates HMD SoC 2 of HMD 12 and peripheral SoC 4 of peripheral device 6, for ease of illustration and discussion. To preserve security and digital rights, in some examples, HMD SoC 2 and peripheral SoC 4 are configured to communicate with one another using encrypted data streams, such as by sending crypto packet flows over a wireless link formed using respective peripheral component interface (PCI) express (PCIe) buses of HMD SoC 2 of HMD 12 and peripheral SoC 4. In some such examples, HMD SoC 2 invokes an Advanced Encryption Standard (AES) engine to encrypt egress data before transmission to peripheral SoC 4 and to decrypt ingress data after receipt from peripheral SoC 4.

In the example shown in FIG. 1A, HMD SoC 2 includes an OTP memory 42 and a security processor 40 configured to prevent unwanted access to OTP memory 42. Similarly, peripheral SoC 4 includes an OTP memory 62 and a security processor 60 configured to prevent unwanted access to OTP memory 42.

Figure 1B:
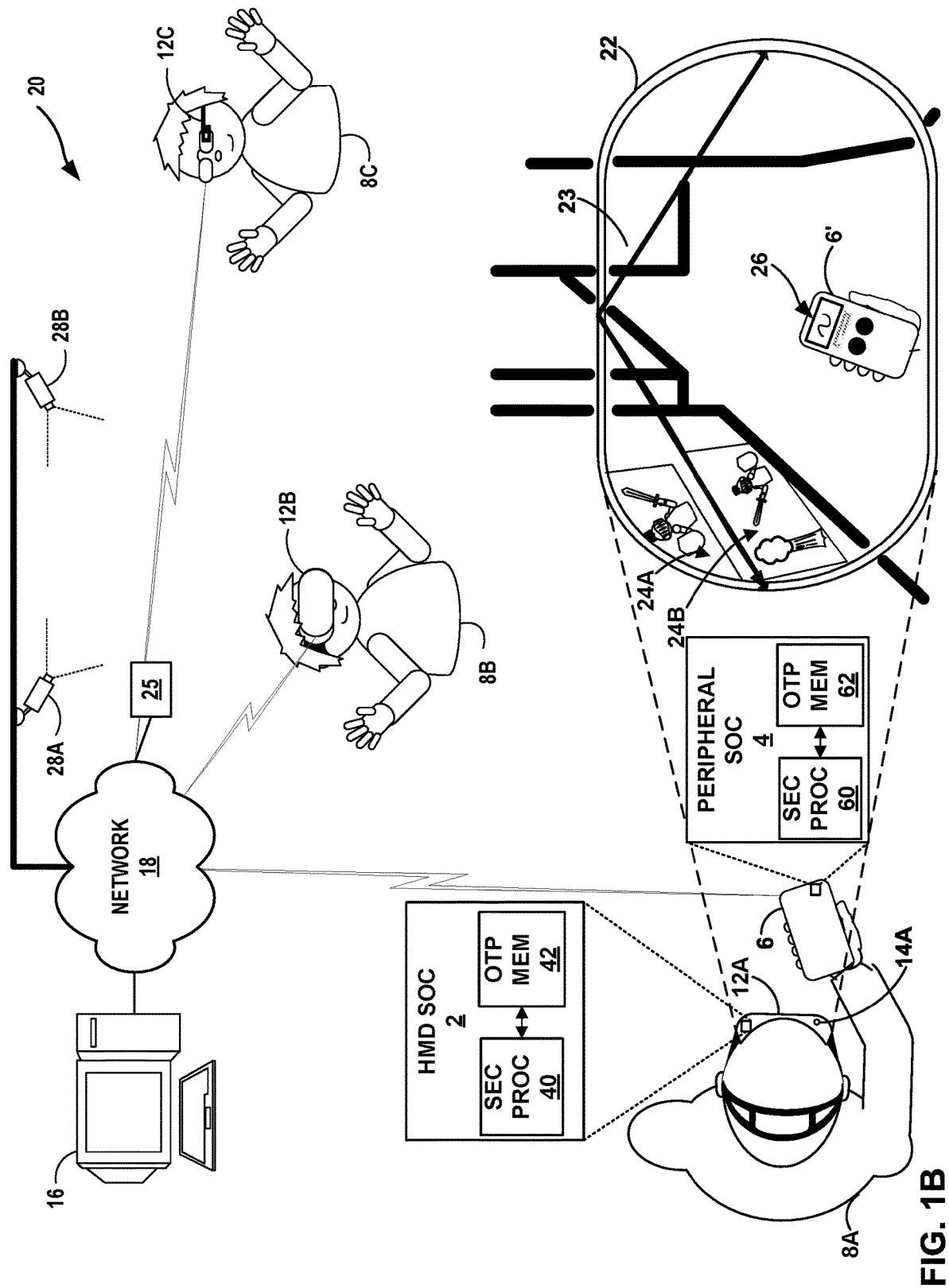
FIG. 1B is an illustration depicting an alternate example artificial reality system, in accordance with aspects of this disclosure.

FIG. 1B is an illustration depicting an alternate example artificial reality system, in accordance with aspects of this disclosure. Similar to multi-device artificial reality system 10 of FIG. 1A, the HMD SoC 2 in FIG. 1B includes an OTP memory 42 and a security processor 40 configured to prevent unwanted access to OTP memory 42. Similarly, peripheral SoC 4 includes an OTP memory 62 and a security processor 60 configured to prevent unwanted access to OTP memory 42.

In the example of FIG. 1B, multi-device artificial reality system 20 includes external cameras 28A and 28B (collectively, "external cameras 28"), HMDs 12A-12C (collectively, "HMDs 12"), console 16, and sensors 25. As shown in FIG. 1B, multi-device artificial reality system 20 represents a multi-user environment in which an artificial reality application executing on console 16 and/or HMDs 12 presents artificial reality content to each of users 8A-8C (collectively, "users 8") based on a current viewing perspective of a corresponding frame of reference for the respective user 8. That is, in this example, the artificial reality application constructs artificial reality content by tracking and computing pose information for a frame of reference for each of HMDs 12. Multi-device artificial reality system 20 uses data received from external cameras 28 and/or HMDs 12 to capture 3D information within the real-world environment, such as motion by users 8 and/or tracking information with respect to users 8, for use in computing updated pose information for a corresponding frame of reference of HMDs 12.

HMDs 12 operate concurrently within multi-device artificial reality system 20. In the example of FIG. 1B, any of users 8 may be a "player" or "participant" in the artificial reality application, and any of users 8 may be a "spectator" or "observer" in the artificial reality application. HMDs 12 of FIG. 1B may each operate in a substantially similar way to HMD 12 of FIG. 1A. For example, HMD 12A may operate substantially similar to HMD 12 of FIG. 1A and may receive user inputs by tracking movements of the hands of user 8A.

Each of HMDs 12 implements a respective user-facing artificial reality platform (or co-implements the platform with a co-processing device, as in the case of HMD 12A with peripheral device 6), and outputs respective artificial content, although only artificial reality content 122 output by HMD 12A is shown in FIG. 1B, purely for the purpose of ease of illustration. As shown in FIG. 1B, two or more of HMDs 12 may, but need not necessarily, conform to the same form factor. Various form factors of HMDs 12 are shown in FIG. 1B, including a goggle form factor and an eyeglass form factor. In some use case scenarios, HMDs 12B and/or 12C may also be paired (e.g., wirelessly coupled or tethered to) a portable device that implements generally corresponding features to those described with respect to peripheral device 6.

Figure 2A:
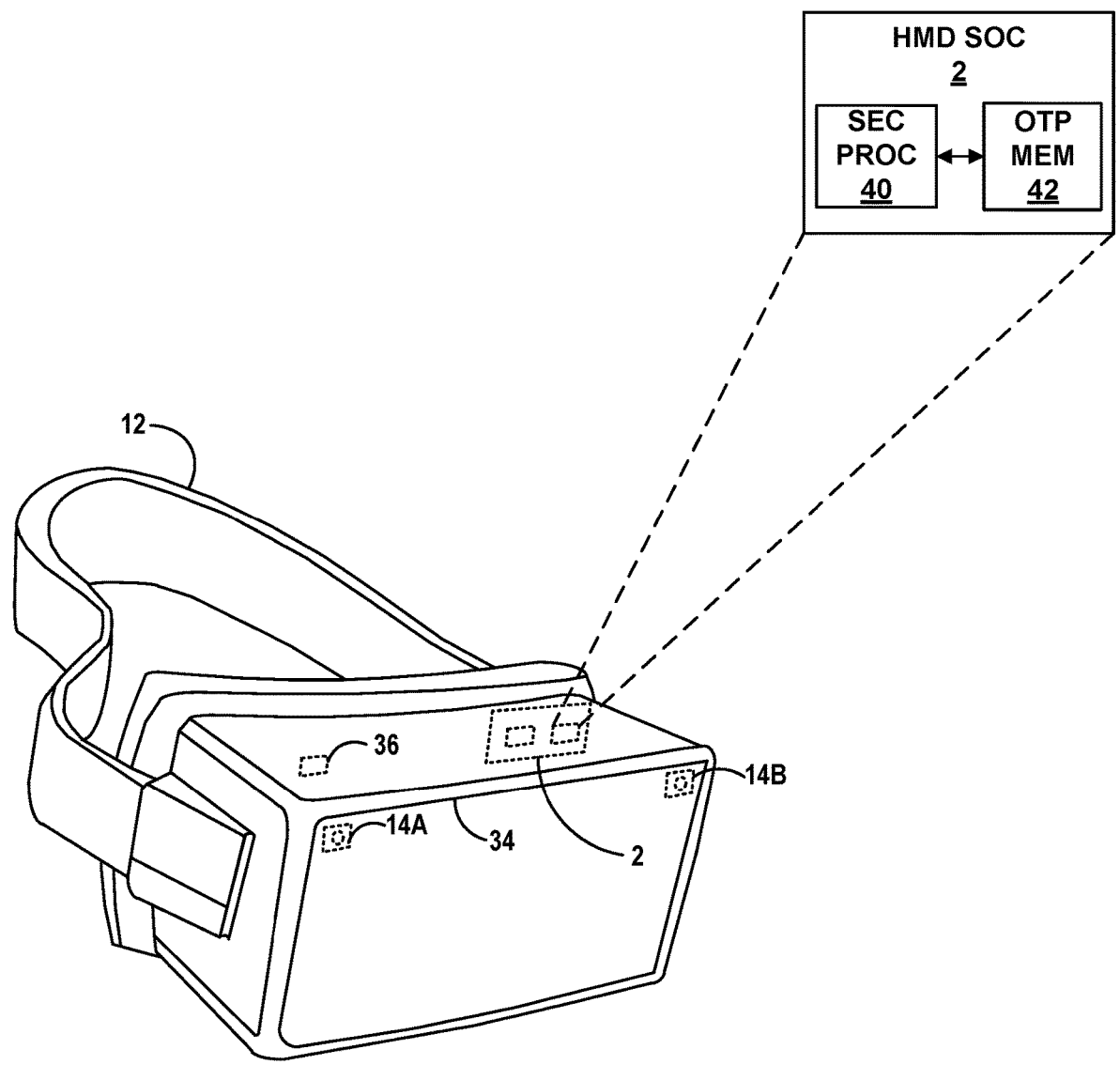
FIG. 2A is an illustration depicting an example HMD configured to prevent unwanted access to OTP memory, in accordance with the techniques of the disclosure.

FIG. 2A is an illustration depicting an example HMD configured to prevent unwanted access to OTP memory, in accordance with the techniques of the disclosure. HMD 12 of FIG. 2A may be an example of any of HMDs 12 of FIGS. 1A and 1B. In some examples, HMD 12 may be part of an artificial reality system that incorporates other devices and network intermediaries, such as in the examples of multi-device artificial reality systems 10 and 20 illustrated in FIGS. 1A and 1B. In other examples, HMD 12 may operate as a standalone, mobile artificial realty system configured to prevent unwanted access to OTP memory 42 via the techniques described herein. In the example of FIG. 2A, HMD 12 takes the general form factor of a headset or goggles.

In this example, HMD 12 includes a front rigid body and a band to secure HMD 12 to the wearer (e.g., user 8). In addition, HMD 12 includes an interior-facing electronic display 34 configured to present artificial reality content to user 8. Electronic display 34 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 34 relative to the front rigid body of HMD 12 is used as a frame of reference, also referred to as a local origin, when tracking the position and orientation of HMD 12 for rendering artificial reality content according to a current viewing perspective of HMD 12 and user 8.

Figure 2B:
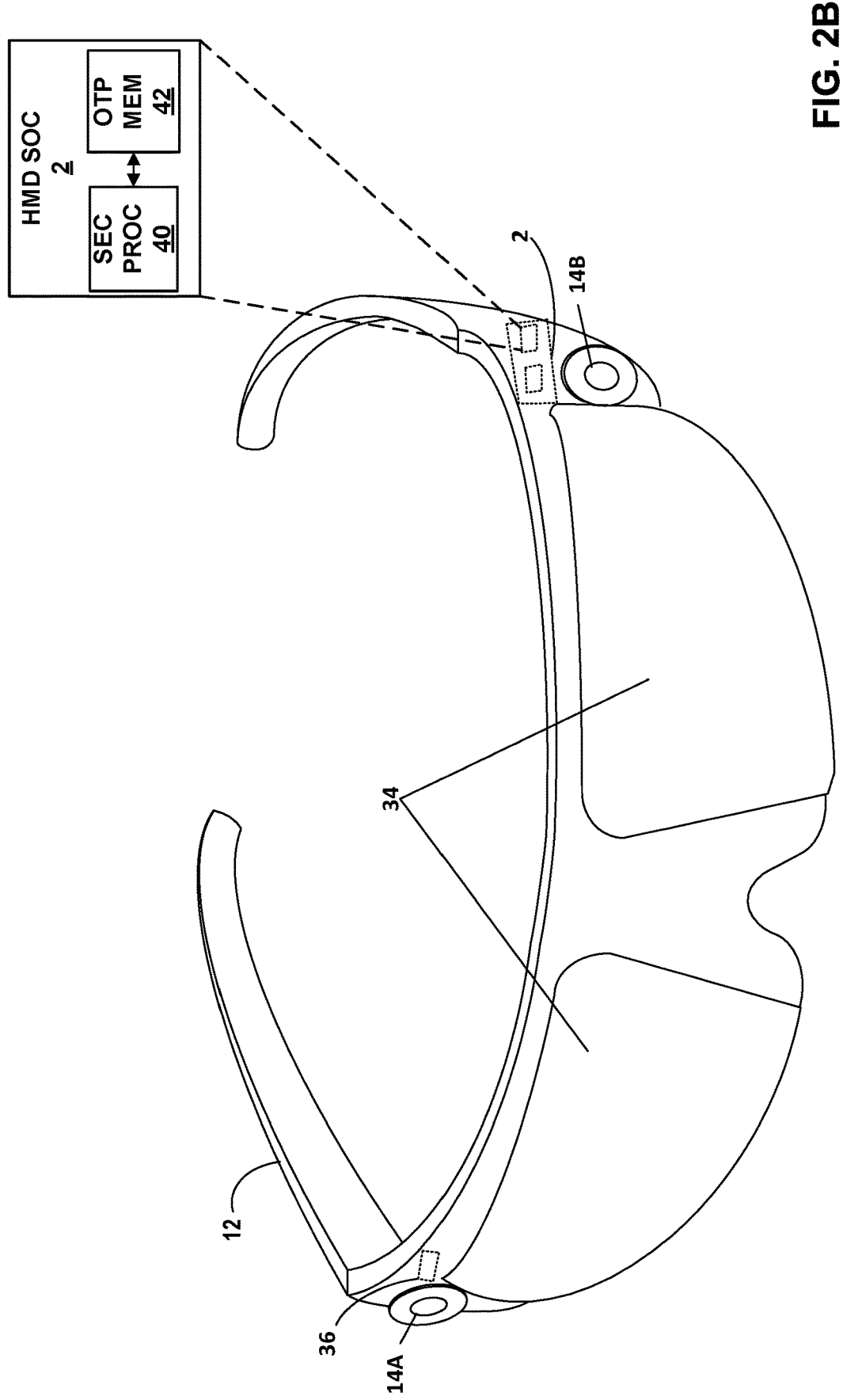
FIG. 2B is an illustration depicting another example of an HMD configured prevent unwanted access to OTP memory, in accordance with the techniques of the disclosure.

FIG. 2B is an illustration depicting another example of an HMD configured prevent unwanted access to OTP memory, in accordance with the techniques of the disclosure. HMD 12 of FIG. 2B may be an example of any of HMDs 12 of FIGS. 1A and 1B. HMD 12 may be part of an artificial reality system, such as artificial reality systems 10, 20 of FIGS. 1A, 1B, or may operate as a stand-alone, mobile artificial realty system configured to prevent unwanted access to OTP memory 42 via the techniques described herein. In the example of FIG. 2B, HMD 12 takes the general form factor of glasses.

In this example, HMD 12 includes a front rigid body and two stems to secure HMD 12 to a user, e.g., by resting over the wearer's ears. Elements of FIG. 2B that share reference numerals with elements of FIG. 2A perform corresponding functionalities and are not described separately with respect to FIG. 2B for the sake of brevity. In the example of FIG. 2B, electronic display 34 may be split into multiple segments, such as into two segments, with each segment corresponding to a separate lens disposed on the rigid front body of HMD 12. In other examples in accordance with FIG. 2B, electronic display 34 may form a contiguous surface that spans both lenses and the lens-connecting bridge (i.e., the over-the-nose portion) of the rigid front body of HMD 12. In some examples in accordance with the form factor illustrated in FIG. 2B, electronic display 34 may also encompass portions of HMD 12 that connect the lenses of the front rigid body to the stems, or optionally, portions of the stems themselves. These various designs of electronic display 34 in the context of the form factor of HMD 12 shown in FIG. 2B may improve accessibility for users having different visual capabilities (e.g., with respect to peripheral vision and/or central vision, nearfield vision and/or distance vision, etc.), eye movement idiosyncrasies, etc.

In the examples illustrated in each of FIGS. 2A & 2B, HMD 12 further includes one or more motion sensors 36, such as one or more accelerometers (also referred to as inertial measurement units or "IMUs") that output data indicative of current acceleration of HMD 12, GPS sensors that output data indicative of a location of HMD 12, radar, or sonar that output data indicative of distances of HMD 12 from various objects, or other sensors that provide indications of a location or orientation of HMD 12 or other objects within a physical environment.

In the examples illustrated in each of FIGS. 2A & 2B, HMD 12 includes integrated image capture devices 14A and 14B (collectively, "image capture devices 14"). Image capture devices 14 may include still image camera hardware, video camera hardware, laser scanners, Doppler® radar scanners, fundus photography hardware, infrared imaging cameras, depth scanners, or the like. Image capture devices 14 may include outward-facing and/or inward-facing image capture hardware, and include any hardware configured to capture image data representative of a surrounding physical environment, and optionally, to preprocess and/or post process the captured image data.

Outward-facing camera hardware of image capture devices 14 may capture image data of the physical environment outside of HMD 12, such as, but not limited to, the real-world environment at which user 8 is positioned. Inward-facing camera hardware of image capture devices 14 may capture image data of the wearer of HMD 12, such as facial images and/or retina scans. Other inward-facing sensor hardware of HMD 12 may capture other types of information pertaining to the wearer, such as temperature information or other types of information or metrics.

In the examples illustrated in FIGS. 2A and 2B, HMD 12 includes HMD SoC 2. SoC 2 of HMD 12 includes security processor 40 and OTP memory 42, as described above with respect to FIGS. 1A and 1B. SoC 2 may also include an internal power source and one or more printed-circuit boards having one or more processors, memory, and hardware to provide an operating environment for executing programmable operations to process sensed data and present artificial reality content on display 34.

OTP memory 42 is a persistent non-mutable storage entity. Memory 42 may, for instance, perform functions such as storing and managing life-cycle information. For example, each life cycle may have unique attributes with respect to chip functionality and testability. OTP memory 42 can be the fundamental source of information that provides such life-cycle information.

In addition, OTP memory 42 may store non-mutable code such as a first stage boot-loader and ROM patches, SoC configuration bits for, for example, other IP blocks (such as sensor or analog macros), and secrets such as signing keys, encryption keys, privileges and permissions. These secrets may be used to authenticate mutable firmware in subsequent stages of the boot sequence as it is fetched from external storage such as flash memory.

In accordance with the techniques of this disclosure, security controller 40 may prevent unwanted access to OTP memory 42. In one such approach, security controller 40, on receiving a request to access OTP memory, determines if the OTP memory is in a state that permits such access. For instance, security controller may determine if OTP memory 42 has been trimmed or calibrated, and prevent further attempts to trim or calibrate OTP memory 42. In another example approach, security controller 40 reviews a memory location, a status pin or other such data source to determine if the access can proceed. In one such approach, security processor 40 and OTP memory 42 represent an integrated silicon hardware unit.

In some examples, HMD SoC 2 of HMD 12 includes an AES engine (not shown), as described above with respect to FIGS. 1A & 1B. In one such example approach, the AES engine is configured to randomly switch between executing round(s) of multi-round encryption with a first polynomial and executing round(s) of multi-round decryption with a second polynomial (that is different from the first polynomial) in accordance with aspects of this disclosure. By multiplexing polynomial-diverse AES rounds against each other, the AES engine causes HMD 12 to exhibit a randomized power trace signature that effectively decorrelates the power trace from the respective data-key pairs under encryption and decryption. In this way, the AES engine generates power profile divergence between the encryption rounds and decryption rounds of the mixed sequence of AES rounds in digital logic, while providing the SCA-preventive benefits of the power profile divergence to both the encryption and decryption operation sets. As such, the configurations of this disclosure improve data security without requiring additional hardware overhead to provide the data security improvement.

Figure 2C:
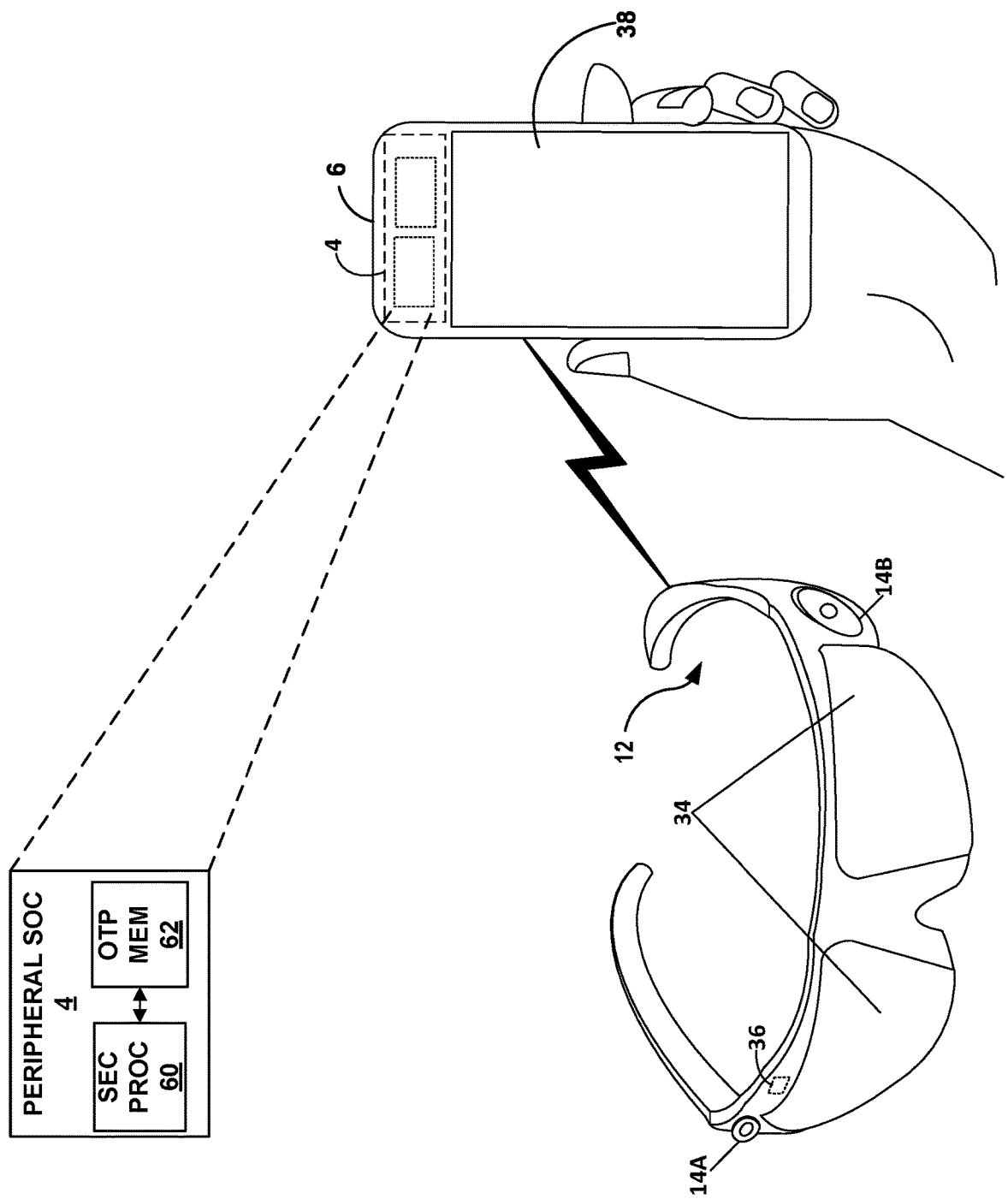
FIG. 2C is an illustration depicting an example of a peripheral device configured prevent unwanted access to OTP memory, in accordance with the techniques of the disclosure.

FIG. 2C is an illustration depicting an example of a peripheral device configured to prevent unwanted access to OTP memory, in accordance with the techniques of the disclosure. Peripheral SoC 4 of peripheral device 6 performs one or more of the methods for preventing unwanted access to OTP memory 42 described in this disclosure. HMD 12 of FIG. 2C may be an example of any of HMDs 12 of FIGS. 1A and 1B, and takes the form factor of glasses, as in the case of HMD 12C of FIG. 1B and HMD 12 of FIG. 2B. In the example of FIG. 2C, image capture devices 14 may capture image data representative of various objects, including peripheral device 6 and/or the hand(s) of user 8 in the physical environment that are within the FoV of image capture devices 14, which may generally correspond to the viewing perspective of HMD 12.

In accordance with the techniques of this disclosure, security controller 60 may prevent unwanted access to OTP memory 62. In one such approach, security controller 60, on receiving a request to access OTP memory 62, determines if the OTP memory is in a state that permits such access. For instance, security controller 60 may determine if OTP memory 62 has been trimmed or calibrated, and prevent further attempts to trim or calibrate OTP memory 62. In another example approach, security controller 60 reviews a memory location, a status pin or other such data source to determine if the access is permitted. In some examples, peripheral SoC 4 supports various components, including security controller 60, OTP memory 62 and other modules, elements, or operations described herein, configured within an integrated circuit.

Surface 38 of peripheral device 6 represents an input component or a combined input/output component of peripheral device 6. Surface 38 may include sensing capabilities, such as those of a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen), touchpad, buttons, trackball, scroll wheel, or other presence-sensitive hardware that uses capacitive, conductive, resistive, acoustic, or other technology to detect touch and/or hover input.

Surface 38 may enable peripheral device 6 to receive touch input or gesture input without direct contact with surface 38. User 8 may provide these touch or gesture inputs to peripheral device 6 to provide instructions directly to peripheral device 6, or indirectly to HMD 12 and/or other components of an artificial reality system in which HMD 12 is deployed. In some examples, processing circuitry of HMD 12 may utilize image capture devices 14 to analyze configurations, positions, movements, and/or orientations of peripheral device 6, of the hand(s) or digit(s) thereof of user 8 to enable to provide input using gestures such as drawing gestures or typing gestures provided via a graphical keyboard.

Peripheral device 6 can communicate data to and receive data from HMD 12 (e.g., egress and ingress crypto packet flows) using wireless communications links (e.g., Wi-Fi™, near-field communication of short-range wireless communication such as Bluetooth®, etc.), or using wired communication links, or combinations thereof, or using other types of communication links. In the example of FIG. 2C, peripheral device 6 is also communicatively coupled to network 18, thereby enabling peripheral device 6 to upload cipher text generated by an AES engine in SoC 4 to securely communicate data to remote devices over network 18.

In this way, peripheral device 6 may offload various hardware and resource burdens from HMD 12, which enables low-profile form factor designs of HMD 12. Peripheral device 6 also serves as a communications intermediary between HMD 12 and devices at remote locations, via network 18. Further details of peripheral device 6 are described in U.S. patent application Ser. No. 16/506,618 (filed on 9 Jul. 2019), the entire content of which is incorporated herein by reference.

Figure 3:
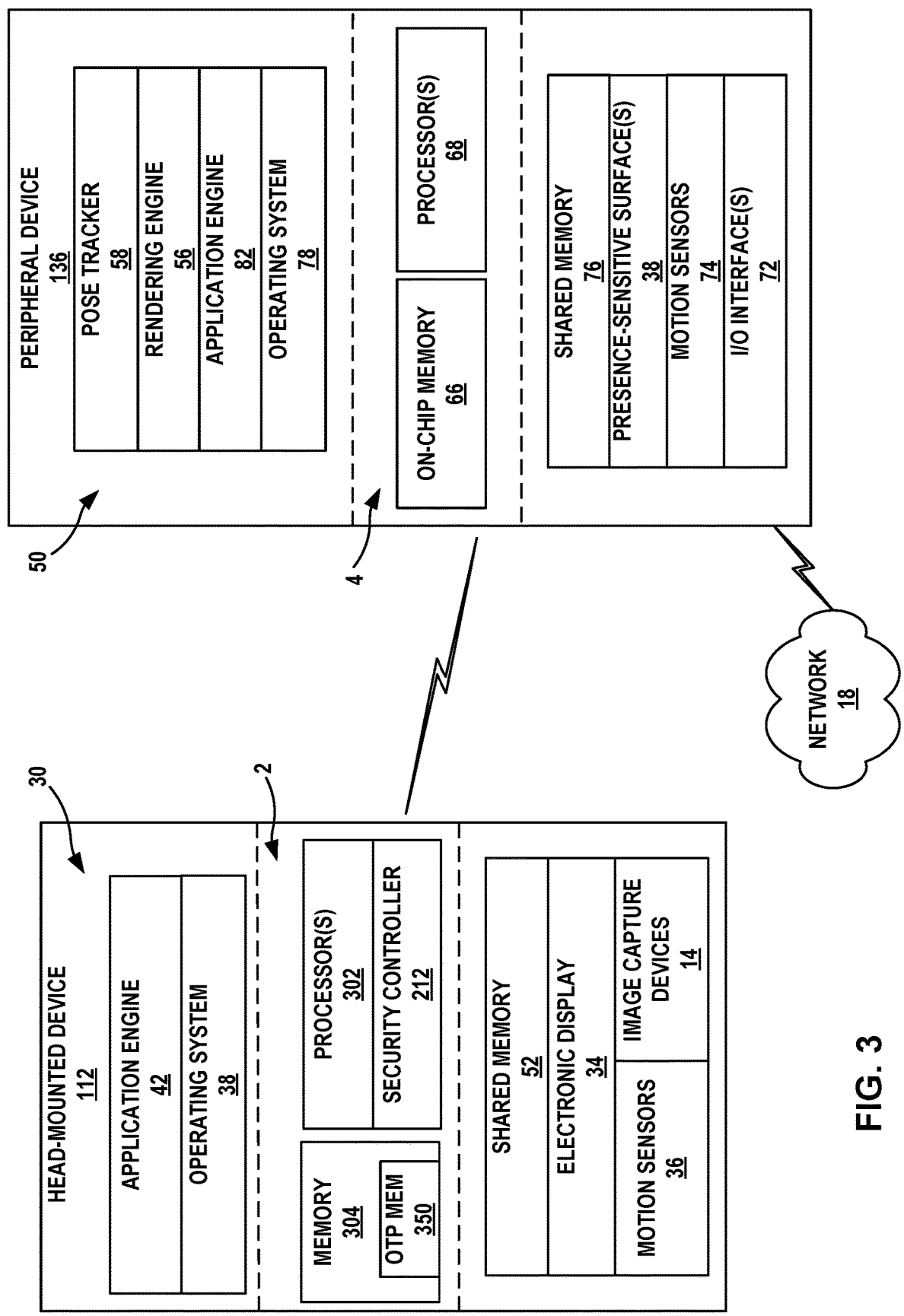
FIG. 3 is a block diagram showing example implementations of an HMD and peripheral device of a multi-device artificial reality system of FIGS. 1A and 1B, in accordance with techniques described in this disclosure.

FIG. 3 is a block diagram showing example implementations of an HMD 12 and peripheral device 6 of a multi-device artificial reality system 10, 20 of FIGS. 1A and 1B, in accordance with techniques described in this disclosure. In this example, HMD SoC 2 of an HMD 112 includes one or more processors 302 and shared memory 52. HMD 112 may be an example of HMD 12 and peripheral 136 may be an example of peripheral 6 of 1A-2C. Shared memory 52 and processor(s) 302 of HMD 112 may, in some examples, provide a computer platform for executing an operating system 38. Operating system 38 may represent an embedded, real-time multitasking operating system, for instance, or other type of operating system. In turn, operating system 38 provides a multitasking operating environment for executing one or more software components 30, including application engine 42.

Processor(s) 302 may be coupled to one or more of electronic display 34, motion sensors 36, and/or image capture devices 14. Processor(s) 302 are included in HMD SoC 2, which also includes on-chip memory 304. On-chip memory 304 is collocated with processor(s) 302 within a single integrated circuit denoted as HMD SoC 2 in the example shown in FIG. 3. Processor(s) 302 may use on-chip memory 304 as a storage location for self-contained data processing performed within HMD SoC 2. Processor(s) 302 and on-chip memory 304 may combine to implement a scheduler.

HMD 112 is communicatively coupled to peripheral device 136, as shown in FIG. 3. In some examples, peripheral device 136 and HMD 112 function in tandem as co-processing devices to deliver the artificial reality experiences to user 8 as described above with respect to FIGS. 1A, 1B, 2A, 2B and 2C. Peripheral device 136 may offload portions of the computing tasks otherwise performed by HMD 112, thereby enabling a reduced hardware infrastructure and therefore a lower-profile form factor with respect to the design of HMD 112.

Peripheral device 136 includes presence-sensitive surface 38 (described above with respect to FIG. 2), as well as input/output (I/O) interface(s) 72, and motion sensors 74. Peripheral device 136 may invoke I/O interface(s) 72 to send and receive data over network 18, such as cipher text or plain text (unencrypted) data. I/O interface(s) 72 may also incorporate hardware that enables peripheral device 136 to communicate wirelessly with HMD 112. Peripheral device 136 may invoke motion sensors 74 to detect and track motion by user 8 for use in computing updated pose information for a corresponding frame of reference of HMD 112.

Peripheral SoC 4 of peripheral device 136 includes on-chip memory 66 and one or more processors 68. On-chip memory 66 represents memory collocated with processor(s) 68 within a single integrated circuit denoted as peripheral SoC 4 in the example shown in FIG. 3. Processor(s) 68 may use on-chip memory 66 as a storage location for self-contained data processing performed within peripheral SoC 4.

Shared memory 76 and processor(s) 68 of peripheral device 136 provide a computer platform for executing an operating system 78. Operating system 78 may represent an embedded, real-time multitasking operating system, for instance, or other type of operating system. In turn, operating system 78 provides a multitasking operating environment for executing one or more software components 50.

Apart from operating system 78, software components 50 include an application engine 82, a rendering engine 56, and a pose tracker 58. In some examples, software components 50 may not include rendering engine 56, and HMD 112 may perform the rendering functionalities without co-processing with peripheral device 136. In general, application engine 82, when invoked, provides functionality to provide and present an artificial reality application, e.g., a teleconference application, a gaming application, a navigation application, an educational application, a training application, a simulation application, or the like, to user 8 via HMD 112. Application engine 82 may include, for example, one or more software packages, software libraries, hardware drivers, and/or Application Program Interfaces (APIs) for implementing an artificial reality application. Responsive to control by application engine 82, rendering engine 56 generates artificial reality content 22 (e.g., incorporating 3D artificial reality content) for display to user 8 by application engine 42 of HMD 112.

Application engine 82 and rendering engine 56 construct artificial reality content 22 for display to user 8 in accordance with current pose information for a frame of reference, typically a viewing perspective of HMD 112, as determined by pose tracker 58. Based on the current viewing perspective as determined by pose tracker 58, rendering engine 56 constructs artificial reality content 22 (e.g., 3D artificial content) which may in some cases be overlaid, at least in part, upon the real-world 3D environment of user 8.

During this process, pose tracker 58 operates on sensed data received from HMD 112, such as movement information and user commands, and, in some examples, data from any external sensors 25 (shown in FIG. 1A), to capture 3D information within the real-world environment, such as motion by user 8 and/or feature tracking information with respect to user 8. Based on the sensed data, pose tracker 58 determines a current pose for the frame of reference of HMD 112 and, in accordance with the current pose, constructs artificial reality content 22 for communication, via one or more I/O interfaces 72, to HMD 112 for display to user 8.

While HMD 112 and peripheral device 136 may communicate on several levels, FIG. 3 is primarily described with respect to communications at the level represented by HMD SoC 2 and peripheral SoC 4. Similarly, processor(s) 302 can include a security processor of HMD SoC 2, and processor(s) 68 can include a security processor of peripheral SoC 4.

Each of processors 302 and 68 may comprise any one or more of a multi-core processor, a controller, a digital signal processor (DSP), an application specific integrated circuit (ASIC), a field-programmable gate array (FPGA), processing circuitry (e.g., fixed-function circuitry or programmable circuitry or any combination thereof) or equivalent discrete or integrated logic circuitry. Any one or more of shared memory 52, shared memory 76, on-chip memory 302, or on-chip memory 66 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), or flash memory.

In some examples, memory 304 comprises a read only memory (ROM) such as OTP memory 350. In some examples, OTP memory 350 stores instructions for executing operating system 38. In some examples, OTP memory 350 stores instructions for performing a boot-strapping operation at power-on of HMD 112 (or SoC 2) to initialize and execute operating system 38. OTP memory 350 typically stores a collection of various sub-routines, many of which have a pre-defined deterministic control flow. Other sub-routines stored by OTP memory 350 may be determined at run-time, such as OTP write, servicing alarms or interrupts, execution of patches, etc.

It may be desirable for OTP memory 350 to be secured from attack so as to prevent unwanted access to or manipulation of information in OTP memory 350. OTP memory 350 may be secured from attack by using a hashing or cryptographic algorithm to encrypt instructions stored by OTP memory 350. However, the use of hashing or cryptographic algorithms may impose significant area overhead on SoC 2 (e.g., by requiring silicon space for an additional 40,000 to 100,000 logic gates that implement cryptographic functions). Further, the use of hashing or cryptographic algorithms may impose noticeable latency in execution of instructions stored by the ROM (e.g., adding a 10- to 64-cycle delay in execution).

In accordance with the techniques described herein, HMD 112 includes security controller 212 that prevents unwanted access or manipulation of the contents of OTP memory 350. In one example approach, security controller 212 prevents unwanted access to OTP memory 350. In one such approach, security controller 212, on receiving a request to access OTP memory 350, determines if the OTP memory is in a state that permits such access. For instance, security controller 212 may determine if OTP memory 350 has been trimmed or calibrated, and prevent further attempts to trim or calibrate OTP memory 350. In another example approach, security controller 212 reviews a memory location, a status pin or other such data source to determine if the access is permitted.

The techniques disclosed herein may enable security controller 212 to prevent unwanted access to or manipulation of instructions stored in OTP memory 350 prior to execution of such instructions by processor 302. Furthermore, the techniques of the disclosure may enable cryptographic authentication of instructions stored by OTP memory 350 without imposing a large latency on the execution of instructions by processor 302. Additionally, the techniques of the disclosure may enable SoC 2 to implement a flexible scheme of protecting the information stored in OTP memory 350.

Figure 4:
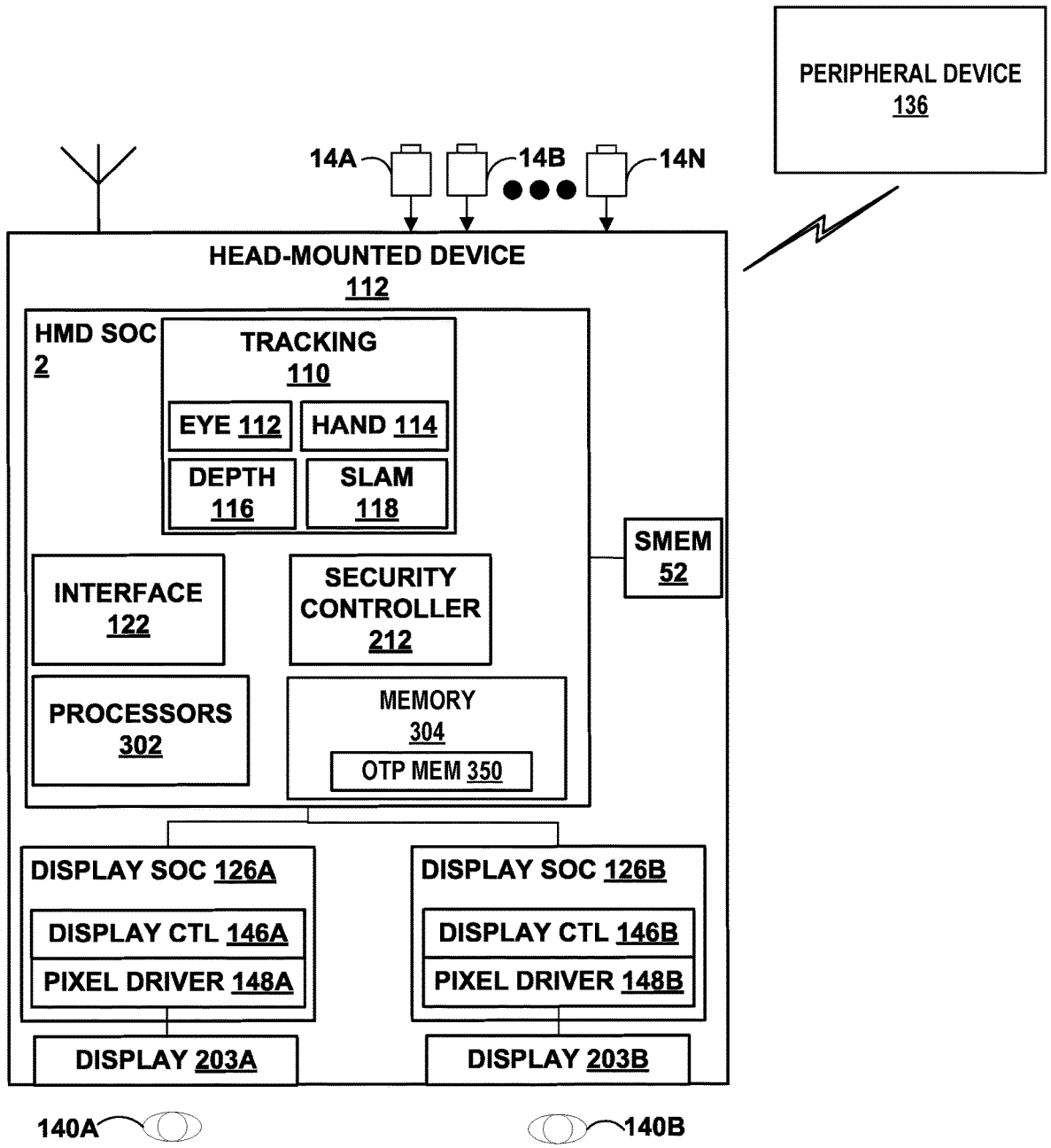
FIG. 4 is a block diagram illustrating a more detailed example implementation of a distributed architecture for multi-device artificial reality system in which HMD 112 is implemented using one or more SoC integrated circuits in accordance with techniques described in this disclosure.

FIG. 4 is a block diagram illustrating a more detailed example implementation of a distributed architecture for a multi-device artificial reality system in which HMD 112 is implemented using one or more SoC integrated circuits in accordance with techniques described in this disclosure. As depicted in the example of FIG. 4, HMD 112 operates in conjunction with peripheral device 136. Again, peripheral device 136 represents a physical, real-world device having a surface on which multi-device artificial reality systems 10 or 20 overlay virtual content. In some examples, peripheral device 136 may have a form factor like any of a smartphone, a tablet computer, a personal digital assistant (PDA), or other hand-held device. In other examples, peripheral device 136 may have the form factor of a smartwatch, a so-called "smart ring," or other wearable device. Peripheral device 136 may also be part of a kiosk or other stationary or mobile system. Components of peripheral device 136 in FIG. 4 may operate similarly to components of peripheral device 136 in FIG. 3.

HMD SoC 2 represents a specialized integrated circuit, where SoC 2 includes various specialized functional blocks configured to provide an operating environment for artificial reality applications. FIG. 4 is merely one example arrangement of SoC integrated circuits of HMD 112. In other examples, the functionality of SoC integrated circuit 2 may be distributed across HMD 112 and peripheral device 136. The architecture for multi-device artificial reality systems 10 and 20 may include any collection, distribution, and/or arrangement of SoC integrated circuits across HMD 112 and peripheral device 136.

In the example of FIG. 4, HMD SoC 2 of HMD 112 comprises functional blocks including tracking 110, security processor 120, interface 122, and processors. Tracking 110 provides a functional block for eye tracking 112 ("eye 112"), hand tracking 114 ("hand 114"), depth tracking 116 ("depth 116"), and Simultaneous Localization and Mapping (SLAM) 118 ("SLAM 118").

For example, HMD 112 may receive input from one or more accelerometers (e.g., quantities represented in inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 14A-14N (collectively, "image capture devices 14").

Image capture devices 14 may include various inward-facing and/or outward-facing image capture hardware, including one or more of still cameras, video cameras, laser scanners, Doppler® radar scanners, fundal photography hardware, infrared imaging hardware depth scanners, or the like, configured to output image data representative of the physical environment. Image capture devices 14 capture image data representative of objects (including peripheral device 136 and/or hand and/or the eyes of user 8) in the physical environment that are within a field of view of image capture devices, which typically corresponds with the viewing perspective of HMD 112 or the inward-facing view of HMD 112. Based on a portion of the sensed data and/or a portion of the image data, tracking 110 determines, for example, a current pose for the frame of reference of HMD 112 and, in accordance with the current pose, renders the artificial reality content.

Application processors 302 include various processors such as a video processing unit, graphics processing unit (GPU), digital signal processors (DSPs), encoders and/or decoders, and/or others. In accordance with the techniques described in this disclosure, all or portion(s) of a backend shell may be implemented in hardware, software, or a combination of hardware and software. For example, the backend shell of a concurrent application engine may be executed on application processors 302. A plurality of artificial reality applications may be concurrently executed on application processors 302, in some examples.

Display SoCs 126A and 126B (collectively, "display SoCs 126") each represent display controllers for outputting artificial reality content on respective displays, e.g., displays 203 of FIG. 2B. In this example, display SoC 126A includes display controller 146A and pixel driver 148A for display 203A to output artificial reality content for a left eye 140A of user 8. Similarly, display SoC 126B includes display controller 146B and pixel driver 148B for display 203B to output artificial reality content for a right eye 140B of user 8. Displays 203 may include any one or more of light-emitting diode (LED) displays, organic LEDs (OLEDs), quantum dot LEDs (QLEDs), electronic paper (E-ink) displays, liquid crystal displays (LCDs), or other types of displays for displaying digital content, such as artificial reality content 22.

HMD SoC 2 may connect with one or more communication devices (e.g., radio transmitter) using interface 122 for communicating with other devices, such as peripheral device 136.

In some examples, memory 304 comprises OTP memory 350, which is a read-only memory. In some examples, OTP memory 350 stores instructions for executing an operating system. In some examples, OTP memory 350 stores instructions for performing a boot-strapping operation at power-on of HMD 112 (or SoC 2) to initialize and execute the operating system. OTP memory 350 typically stores a collection of various sub-routines, many of which have a pre-defined deterministic control flow. Other sub-routines stored by OTP memory 350 may be determined at run-time, such as one-time programming (OTP) write, servicing alarms or interrupts, execution of patches, etc.

In accordance with the techniques described herein, HMD 112 includes security controller 212 that prevents unwanted access or manipulation of the contents of OTP memory 350. In one example approach, security controller 212 prevents unwanted access to OTP memory 350. In one such approach, security controller 212, on receiving a request to access OTP memory 350, determines if the OTP memory is in a state that permits such access. For instance, security controller 212 may determine if OTP memory 350 has been trimmed or calibrated, and prevent further attempts to trim or calibrate OTP memory 350. In another example approach, security controller 212 reviews a memory location, a status pin or other such data source to determine if the access is permitted.

The techniques disclosed herein may enable security controller 212 to prevent unwanted access to or manipulation of instructions stored in OTP memory 350 prior to execution of such instructions by processor 302. Furthermore, the techniques of the disclosure may enable cryptographic authentication of instructions stored by OTP memory 350 without imposing a large latency on the execution of instructions by processor 302. Additionally, the techniques of the disclosure may enable SoC 2 to implement a flexible scheme of protecting the information stored in OTP memory 350.

Figure 5:
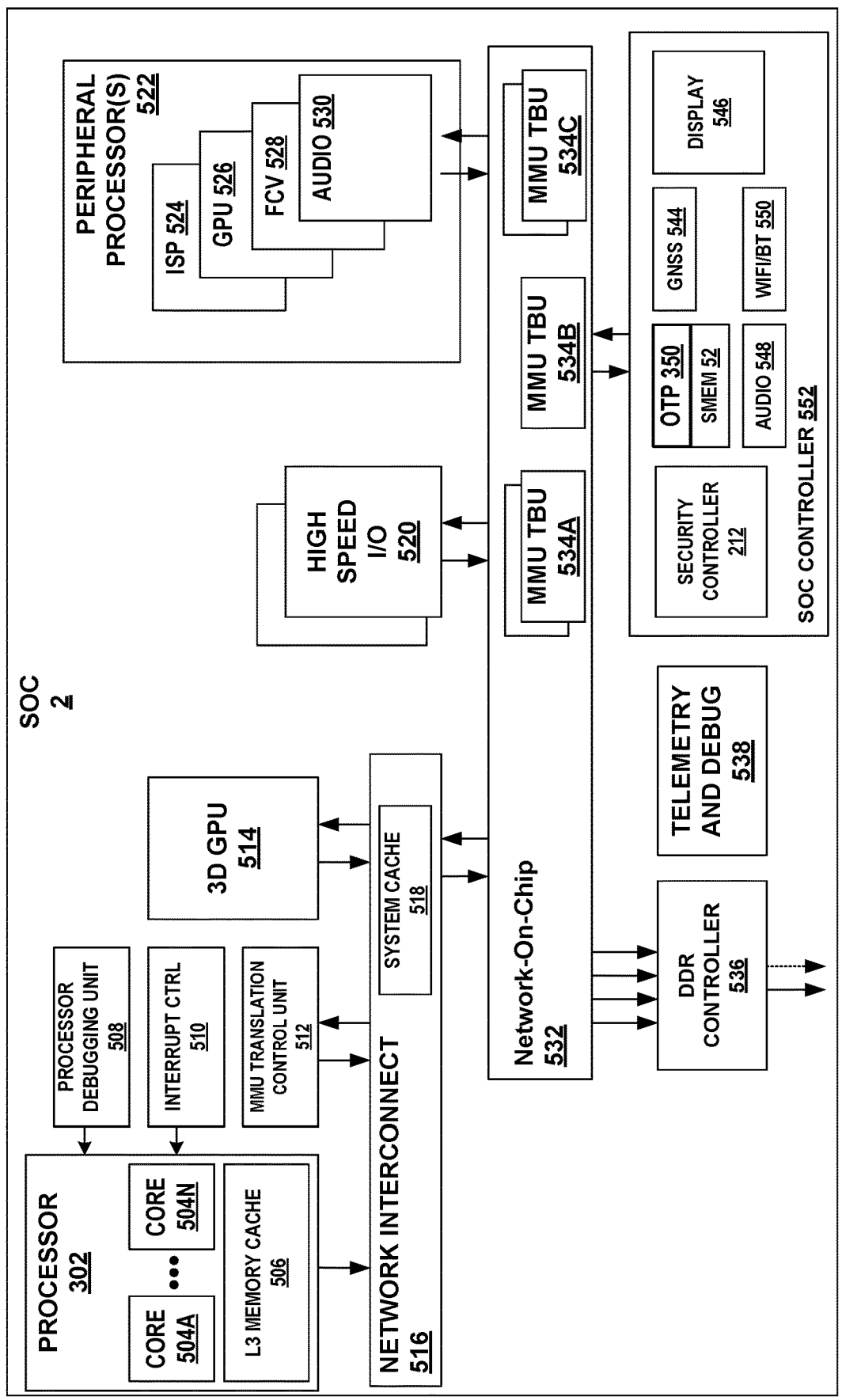
FIG. 5 is a block diagram illustrating an example SoC that may be integrated within the HMD of FIGS. 1A and 1B, in accordance with the techniques of the disclosure.

FIG. 5 is a block diagram illustrating example SoC 2 that may be integrated within HMD 12 of FIGS. 1A and 1B, in accordance with the techniques of the disclosure. SoC 2 includes processor 302, 3D GPU 514, high-speed I/O 520, peripheral processors 522, Network-on-Chip (NoC) integrated circuit 532, Double Data Rate (DDR) controller 536, and controller 552.

Processor 302 is one or more microprocessors, digital signal processors (DSPs), application specific integrated circuits (ASICs), field programmable gate arrays (FPGAs), or any other equivalent integrated or discrete logic circuitry, as well as any combinations of such components. Processor 302 comprises a plurality of processing cores 504A-504N (collectively, "cores 504"). Processor 302 further comprises L3 memory cache 506. L3 memory cache 506 comprises a common memory cache shared by cores 504. Processor debugging unit 508 provides debugging capabilities for processor 302. Interrupt controller 510 services interrupts generated by processor 302 and/or SoC 2.

3D graphic processing unit (GPU) 514 is a graphics process unit that may be configured to provide 3-dimensional (3D) graphics processing capabilities. In some examples, 3D GPU 514 comprises a plurality of cores or cells configured to provide parallel processing capabilities for rendering 3D images or video.

High-speed I/O 520 may provide high-speed input and output capabilities to SoC 2 for communicating with components exterior to SoC 2, such as with other components of HMD 112 or peripheral device 136.

Peripheral processors 522 provide dedicated processors for different types of data serviced by SoC 2. Peripheral processors 522 may include integrated circuitry or hardware configured to process specific types of data. For example, peripheral processors 522 may include image signal processor (ISP) 524 for processing images, GPU 526, FCV 528, and audio processing unit 530.

Network interconnect 516 provides a high-speed interconnection medium between various components of SoC 2, particularly to data transferred between processor 302, 3D GPU 514, memory management unit (MMU) translation control unit (TCU) 512, and MMU translation buffer units (TBUs) 534A-534C of NoC integrated circuit 532, high-speed I/O 520, peripheral processors 522, and DDR controller 536. Network interconnect 516 may include a system cache 518 for storing and/or buffering data transferred between various components of SoC 2.

SoC 2 further includes telemetry and debug unit 538. Telemetry and debug unit 538 may record and transmit telemetry for SoC 2 to an external device, such as HMD 112 or peripheral device 136. Further, telemetry and debug unit 538 may provide debugging functionalities for SoC 2.

SoC controller 552 provides various controllers for driving various functionality of SoC 2. For example, SoC controller 552 includes security controller 212, OTP memory 350, shared memory 52, audio controller 548, Global Navigation Satellite System (GNSS) 544, WIFI and BlueTooth® controller 550, and display controller 546.

In accordance with the techniques described herein, security controller 212 of SoC 2 prevents unwanted access or manipulation of the contents of OTP memory 350. In one example approach, security controller 212 prevents unwanted access to OTP memory 350. In one such approach, security controller 212, on receiving a request to access OTP memory 350, determines if the OTP memory is in a state that permits such access. For instance, security controller 212 may determine if OTP memory 350 has been trimmed or calibrated, and prevent further attempts to trim or calibrate OTP memory 350. In another example approach, security controller 212 reviews a memory location, a status pin or other such data source to determine if the access is permitted.

Figure 6:
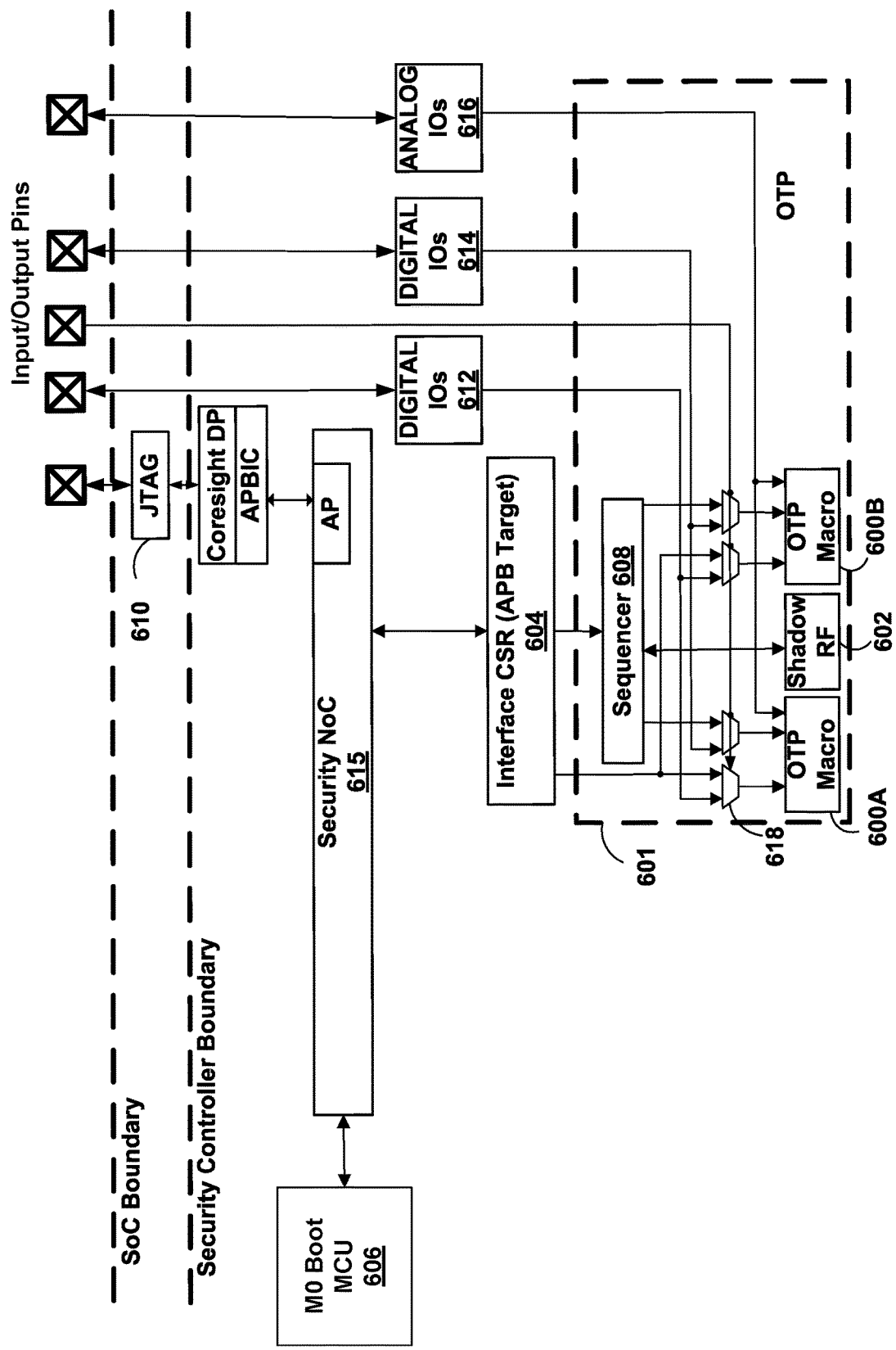
FIG. 6 is a block diagram illustrating an example OTP memory that may be integrated within the HMD of FIG. 5 to prevent unwanted access to OTP memory, in accordance with the techniques of the disclosure.

FIG. 6 is a block diagram illustrating an example OTP memory 350 that may be integrated within the HMD 112 of FIG. 5 to prevent unwanted access to OTP memory 350, in accordance with the techniques of the disclosure. In the example shown in FIG. 6, OTP memory 350 includes two 32 kb OTP macros 600A and 600B (collectively the "OTP macros 600"), a 64 kb shadow register file 602, Command Status Registers (CSRs) 604 with Advanced Peripheral Bus (APB) interface to independently access the OTP macros 600 for reads/writes, and glue logic to stitch the sub-components together, enabling seamless operation of the OTP macros 600 directly from the APB interface and facilitate a more firmware driven OTP read/programming environment. In one example approach, this firmware executes on boot microcontroller unit (MCU) 606.

In the example shown in FIG. 6, in test/debug mode OTP macros 600 may be accessed from Joint Test Action Group (JTAG) interface 610, digital I/O interfaces 612 and 614 and clock interface 616. In some example approaches, digital I/O interface 612 includes a USB interface and digital I/O interface 614 includes a UART interfaces 614. The non-deterministic latency over these varying access scenarios may make it difficult to meet stringent OTP timing requirements. To address these requirements, sequencer 608 orchestrates the toggling of delay sensitive signals to OTP macros 600 in read/program/calibration routines and manages data movement via the shadow register file 602.

In one example approach, OTP operations fall into two categories: Test mode and normal mode. Test modes includes the Wafer-sort and Design for Test (DFT) modes; they are executed by the tester post manufacturing on bare die only. Normal modes are the limited number of operating modes that can be exercised from CSR interface 604. In one example approach, sequencer 608 only supports the normal read and program modes.

In one example approach, OTP macros 600 are located inside a secure OTP block 601. OTP block 601 is accessible by micro-controllers inside security controller 212, such as Boot MCU 606. JTAG interface 610 connects to the OTP block 601 but, in some approaches, this path may be disabled by the Boot MCU 606 in advanced life-cycle states when the chip is in production. In one such approach, Boot MCU 606 blocks JTAG access through security Network on Chip (NoC) 615 by blocking the "NoC port" with a NoC firewall. In one example approach, NoC firewalls are programmable checkpoints that are controlled by security controller MCUs to grant or deny access between various SoC IPs. If a direct access pin is available (as required by certain products), MCU 606 will also selectively block that path by controlling the multiplexers 618 at an analog input/output (IO) 612 of the OTP macro 600 as shown in FIG. 6.

Figure 7:
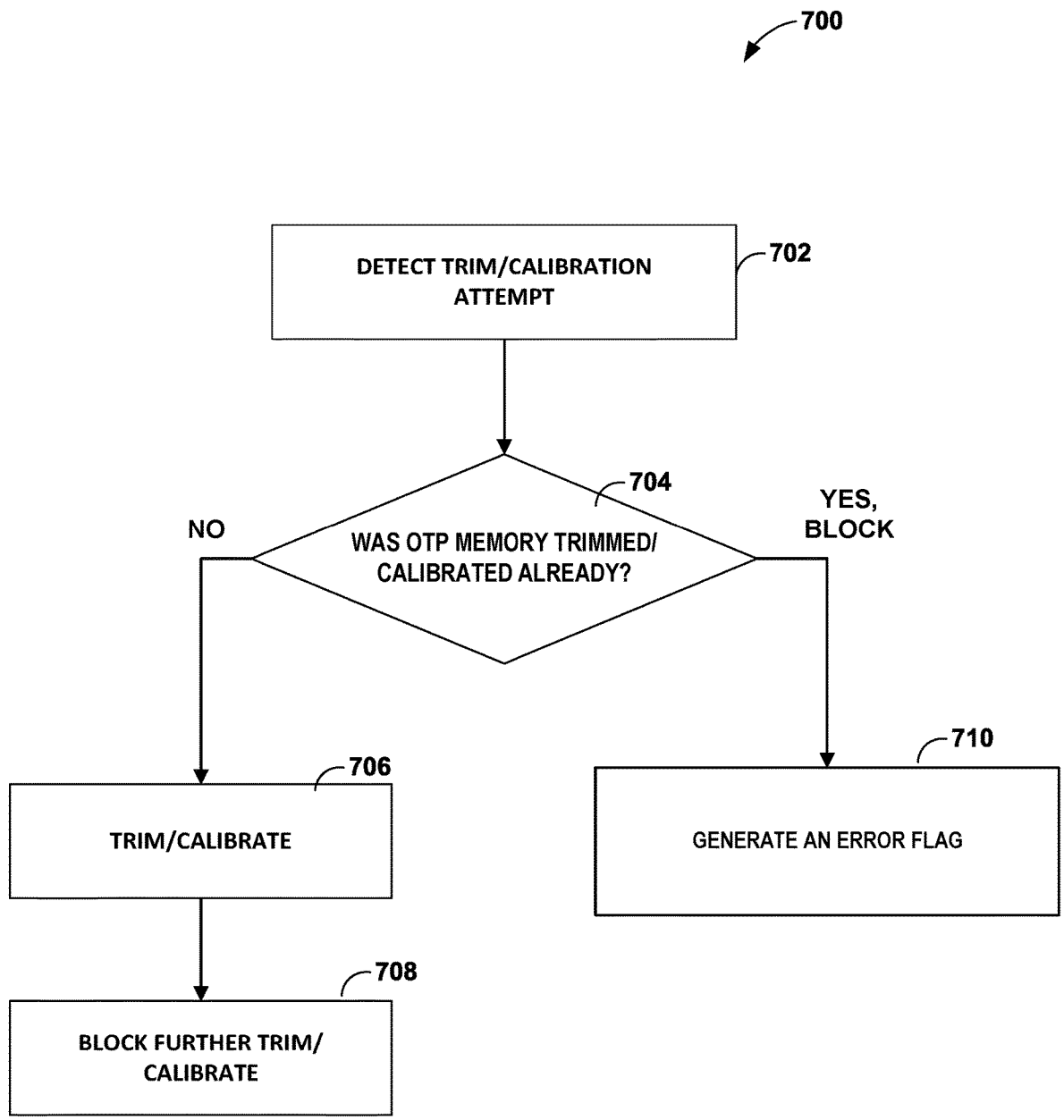
FIG. 7 is a flowchart illustrating an example process that an HMD SoC or peripheral SoC may perform to prevent unwanted trimming or calibration of OTP memory, in accordance with aspects of this disclosure.

FIG. 7 is a flowchart illustrating an example process 700 that HMD SoC 2 or peripheral SoC 4 may perform to prevent unwanted trimming or calibration of OTP memory 350, in accordance with aspects of this disclosure. Process 700 may be performed by HMD SoC 2 and components thereof as a non-limiting example, and it will be appreciated that peripheral SoC 4 (and components thereof) may perform process 700 as well.

As noted above, some OTP memory macros require trimming and calibration of, for instance, internal band-gap reference and charge-pump circuits before they can be used reliably. Once trimmed and calibrated, there is no reason to perform the action again. Therefore, in some example approaches security controller 212 is configured to prevent further trimming and/or calibration. For instance, security controller 212 may receive a request to trim or calibrate the OTP macro 600 [702]. If security controller 212 determines [at 704] that OTP memory has not been trimmed or calibrated (as detailed below), it allows the request and then blocks further attempts to trim or calibrate [708]. If security controller 212 determines [at 704] that OTP memory has been trimmed or calibrated, it blocks the request and, in some approaches, generates an error [710].

Controlling Access to the OTP Macros

As noted above, it may be necessary to prevent hostile or unintended access to OTP memory 42 or OTP memory 62 outside of certain modes, such as test modes. For instance, in some example approaches, SOC 2 and SOC 4 prevent tampering with (i.e., read out or modification) of OTP memory 42 or OTP memory 62 during mission mode operation. Various techniques will now be described that can be used singly or in combination to prevent hostile or unintended access to OTP memory such as OTP memory 42 and OTP memory 62. Such techniques include gating DFT access to OTP memory 42 or OTP memory 62 with a die-bump; using characteristics of data stored in OTP memory 42 or OTP memory 62 to control access to OTP macros 600; and controlling access to OTP macros 600 via a sequencer 608, via bits stored in an unsecured OTP macro, or via a cryptographic challenge-response Authentication.

Gating DFT Access to OTP with Die-Bump.

In one example approach, as shown in FIG. 6, an IO pin 612 is used as the DFT override signal to allow modification of the OTP macro 600 irrespective of device life-cycle state. The tester drives this bump as a side-band signal at wafer sort (to 1) to trim the OTP. During packaging the bump is hard-wired to 0, making DFT debug access depend on life cycle based secure authentication. An advantage of this approach is that it is a simple solution and requires very minimal changes to the boot-sequencer.

In a similar approach, a data bit in a memory that does not require trimming is used to determine if OTP memory has been trimmed. In this approach, an SOC stores the trim status of OTP memory in a memory that does not require trimming, such as a Samsung Efuse. The memory then becomes an integral part of the boot-sequencer used to unlock access to untrimmed OTP macros. Once an OTP macro is trimmed, the status is set in Efuse to block this access path. As in the IO pin example above, an advantage of this approach is that it is a simple solution and requires very minimal changes to the boot-sequencer. In addition, this approach reduces the chances that an attacker can delayer the SOC to read or modify secrets stored in OTP memory.

Figure 8:
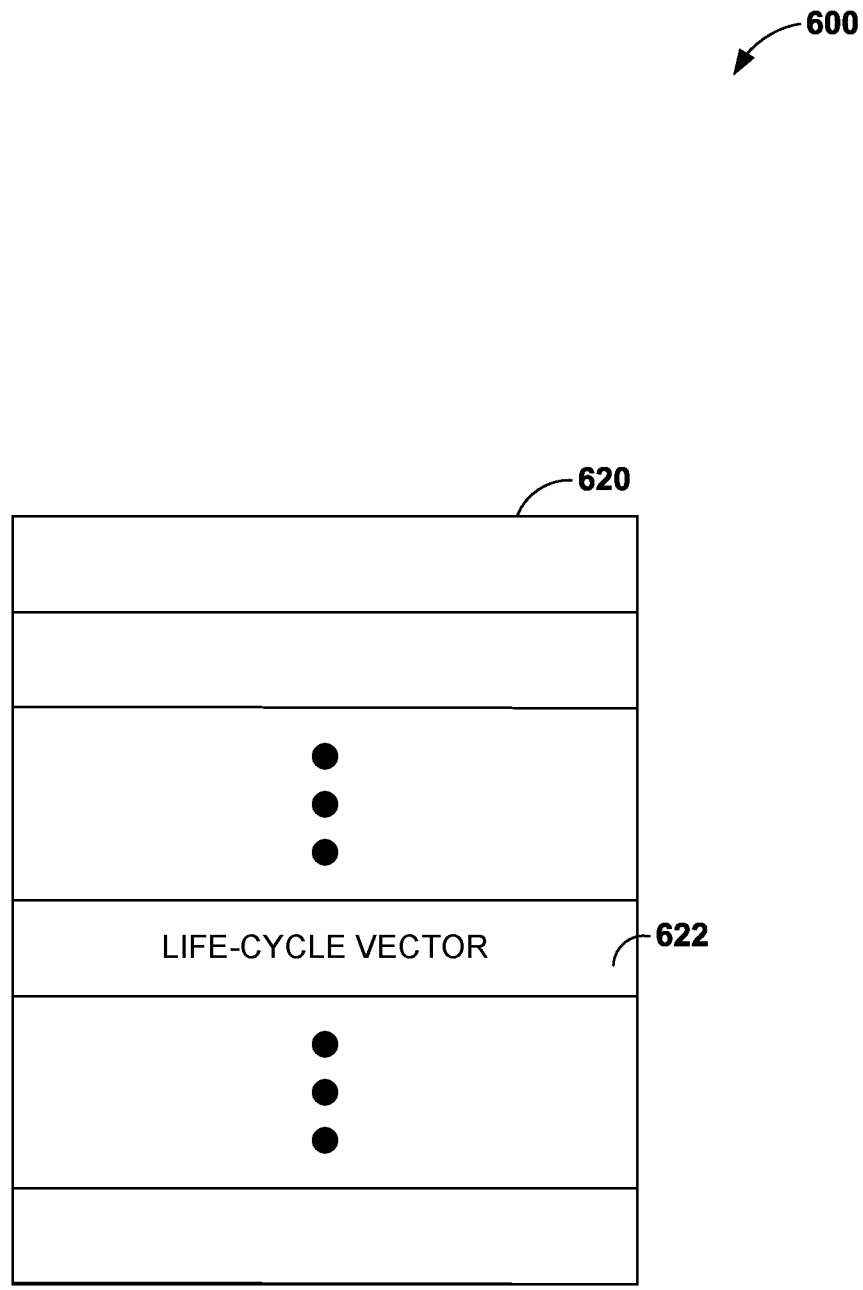
FIG. 8 is a block diagram illustrating a life-cycle vector stored in an OTP memory, in accordance with the techniques of the disclosure.

Using Characteristics of Data Stored in OTP Memory to Control Access to the OTP Macros In one example approach, SOCs 2 and 4 use characteristics of data stored in OTP memory to determine whether the data is representative of a trimmed or an untrimmed OTP macro. FIG. 8 is a block diagram illustrating a life-cycle vector stored in an OTP memory, in accordance with the techniques of the disclosure. In the example shown in FIG. 8, life-cycle vector 622 is stored in a memory location within OTP memory 620 and may be used to detect whether the OTP memory is untrimmed. In one example approach, security controller 212 looks for a pre-defined value in life-cycle vector 622. In another example approach, given knowledge of the statistical probability of read failure in untrimmed OTP memory, security controller 212 may determine whether an OTP memory is trimmed or untrimmed based on the characteristics of the data read from OTP memory 620 at the location reserved for life-cycle vector 622.

In one such method, security controller 212 uses the hamming weight of life-cycle vector 622 to determine if the OTP macro has been trimmed. Given knowledge of the statistical probability of read failure in untrimmed OTP macros 600, security controller 212 counts the number of 1s in the life-cycle vector 622 stored in OTP memory 620. Security controller 212 determines if the number of 1s is lower than a threshold to unlock access. In some example implementations, the threshold may be set to a value of five, which can cover BLANK and TEST life cycle states. The probability of six or more bits (out of 32 bits) having read-errors should be much lower than approaches where a single read-error when reading the life-cycle vector can be catastrophic.

In another example approach, as illustrated in FIG. 8, a special 32*b* field in OTP memory 620 is assigned as life-cycle vector 622. When security controller 212 finds zeros in life-cycle vector 622, controller 212 unlocks access to OTP macro 600 for trimming. Post-trimming, the tester blows this field to 0xFFFFFFFF, locking this access path. In one such example location, a life-cycle vector 622 in either one of OTP macro 600A or 600B is used to determine whether OTP macros 600 have been trimmed. In another example approach, each OTP macro is trimmed and/or calibrated separately and a life-cycle vector 622 in each OTP macro 600A and 600B is used to determine whether the respective OTP macro 600 has been trimmed.

Figure 9:
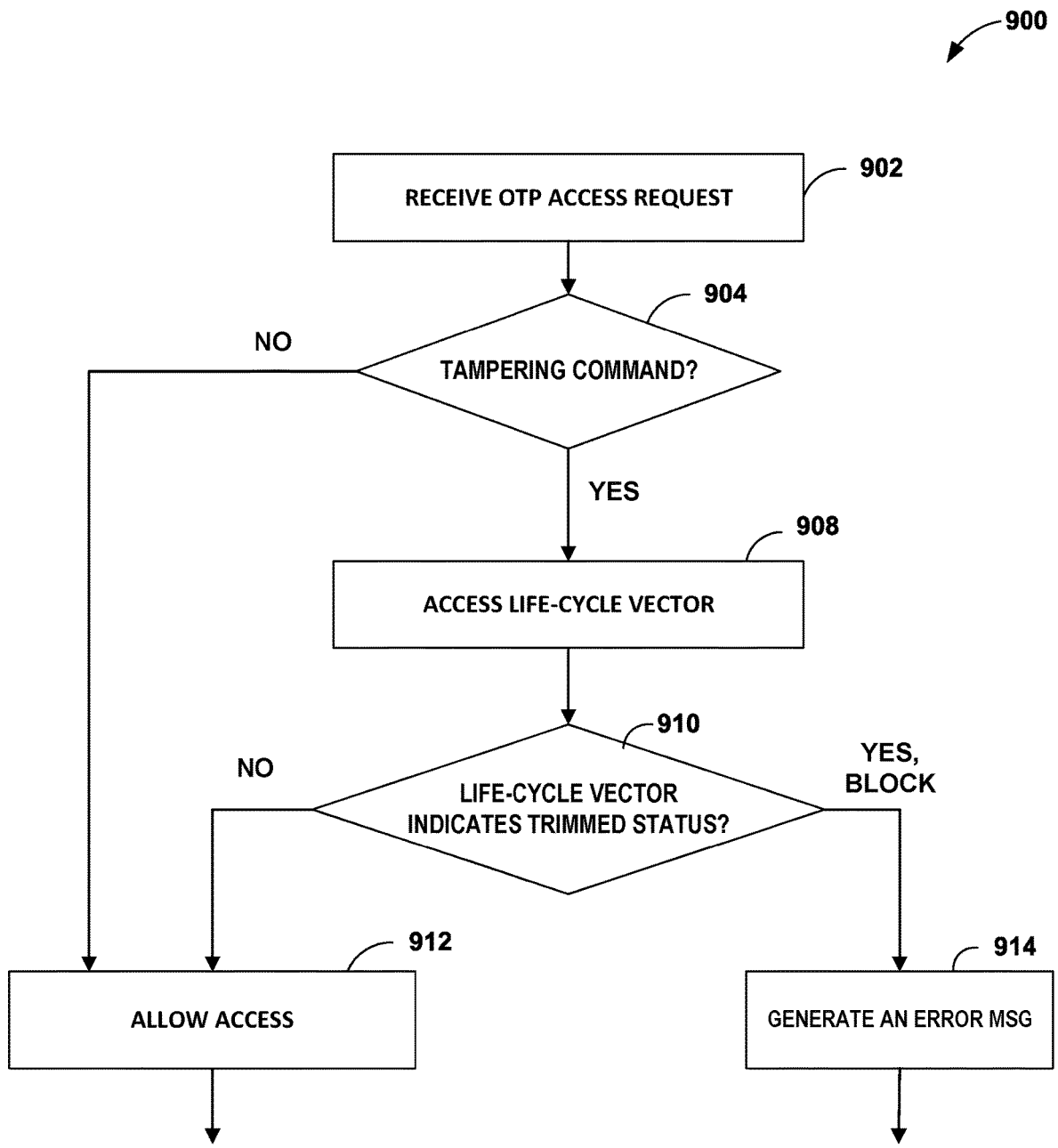
FIG. 9 is a flowchart illustrating one example process for preventing unwanted trimming or calibration of OTP memory, in accordance with aspects of this disclosure.

FIG. 9 is a flowchart illustrating one example process 900 for preventing unwanted access to OTP memory, in accordance with aspects of this disclosure. In the example shown in FIG. 9, an OTP request is received (902). A processor such as security controller 212 determines if the OTP memory request is of a type permitted only within certain life cycles of SOC 2 or SOC 4 (904). If so, security controller 212 is configured to prevent further trimming and/or calibration.

In one example approach, security controller 212 receives a request to trim or calibrate the OTP macro 600, or to otherwise tamper with OTP macro 600 [902]. In one such example approach, requests to trim or calibrate are only permitted if life-cycle vector 622 indicates that such requests have not yet been received. If security controller 212 determines [at 904] that the OTP request is of a type that is permitted during normal operation, controller 212 allows the request [912]. If security controller 212 determines [at 904] that the OTP request is of a type that is not permitted during normal operation, controller 212 reads life-cycle vector 622 and determines if the contents of life-cycle vector 622 indicate that the OTP macro 600 has been trimmed [910]. If the contents of life-cycle vector 622 indicate that the OTP macro 600 has been trimmed, security controller 212 blocks the request and, in some approaches, generates an error [914]. If, however, the contents of life-cycle vector 622 indicate that the OTP macro 600 has not been trimmed, security controller 212 allows the request to proceed [912].

As an example of the operation of process 900 and as discussed above with respect to FIG. 6, in one example approach, when security controller 212 detects an attempt to tamper with OTP memory 42 or OTP memory 62 outside of, for instance, test mode, SOCs 2 and 4 block such access. In one such example approach, Boot MCU 606 blocks access by blocking JTAG access through Network on Chip (NoC) 615 to OTP memory. In one such example approach, access via JTAG is prevented by blocking an "NoC port" with an NoC firewall.

Controlling Access to the OTP Macros Via Boot-Sequencer

In OTP memory applications which rely on trimming and calibration, a tester runs tests to ensure that a part has been successfully trimmed as part of the OTP memory trimming and calibration flows. In one example approach, a processor takes advantage of these tests to determine if an OTP macro has been trimmed by, for instance, running one or more OTP tests as part of a boot sequence.

In one example approach, a processor runs one or more of the same or similar tests run by the tester to determine whether OTP memory 350 has been trimmed. The processor leverages these tests to distinguish a trimmed part from an untrimmed part. In one example approach, applicable for Samsung macros and perhaps others, security controller 212 executes either or both of a write test (e.g., WRTEST) and one or more margin read tests in boot-sequencer logic at every boot to identify whether OTP macro 600 is a trimmed part. In one such example approach, the processor runs margin read tests in which the entire OTP macro 600 is read and results are compared against a pre-defined checkerboard pattern of AAs and 55s. For WRTEST, only the latter half of this test may be used, where system controller 212 reads OTP spare rows and expects a previously agreed-upon pattern. As an example, this pattern could be an A5 checkerboard or a code shared with the tester. An advantage of this approach is that this solution may be driven in firmware, allowing for late-binding modifications. In one example approach, these test sequences are included as part of the ROM code in the boot sequencer.

Figure 10:
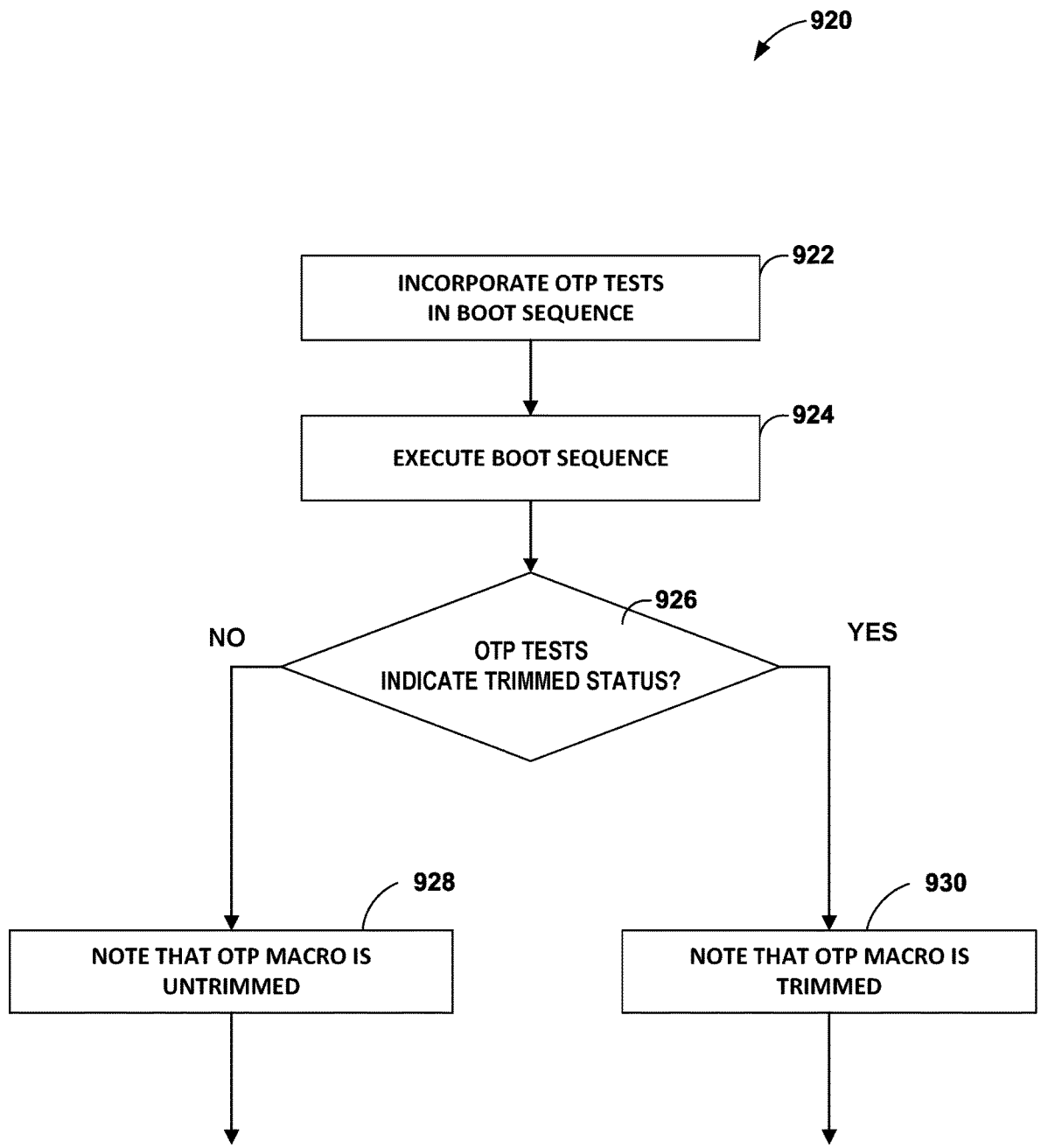
FIG. 10 is a flowchart illustrating one example process for detecting whether an OTP macro has been trimmed, in accordance with aspects of this disclosure.

FIG. 10 is a flowchart illustrating one example process 920 for detecting whether an OTP macro has been trimmed, in accordance with aspects of this disclosure. In the example shown in FIG. 10, one or more of the trimming detection OTP tests run by the tester are incorporated in boot code to be executed as part of a boot sequence [922]. A boot processor (such as boot MCU 606 of FIG. 6) executes the boot sequence including the one or more trim tests [924]. If the OTP trim tests determine [at 926] that the OTP macro 600 has been trimmed [at 926], indicate trimmed status [930]. If, however, the OTP trim tests determine [at 926] that the OTP macro 600 has not been trimmed, indicate untrimmed status [928].

In one such example approach, if the processor determines the OTP macro 600 has been trimmed, a flag is set indicating that the OTP macro 600 has been trimmed. In another such example approach, the processor writes a word to life-cycle vector 622 indicating that the OTP memory has been trimmed. OTP access requests are then handled based on trimmed status as described in the description of FIG. 9 above.

Controlling Access to a Secure OTP Macro Via Bits Stored in an Unsecured OTP Macro In one example approach, OTP memory 350 is divided into a secure OTP memory and a non-secure OTP memory. In this approach, tamper-proof and restricted-access security objectives can be limited to only the secure part of OTP memory 350. In one example approach, a JTAGENB_SEC_OTP bit in the non-secure OTP macro 600 is used to lock/unlock JTAG access from tester to the secure OTP macros 600 instead of, or in addition to, relying on reading a BLANK life-cycle vector. An extra field of the non-secure OTP macro 600 or a predefined pattern (e.g., 32*b* pattern) may also be used instead of, or in addition to the JTAGENB_SEC_OTP bit.

In one example approach, JTAG tester access to non-secure OTP may always be available, but it is only when the non-secure OTP is trimmed that the JTAGENB_SEC_OTP register will reliably read 0 (or a pre-defined pattern), thereby providing access to the secure OTP memory for trimming. In one such example approach, the JTAGENB_SEC_OTP register resets to a nonzero value.

After trimming the secure OTPs, a tester may return to the non-secure OTP memory and blow JTAGENB_SEC_OTP to 1 (or 0xFF . . . ), thereby disabling future external access to secure OTPs from the tester. An advantage to this approach is that it reduces the attack scope of any package delayering attack without incurring significant overhead in boot-time.

Figure 11:
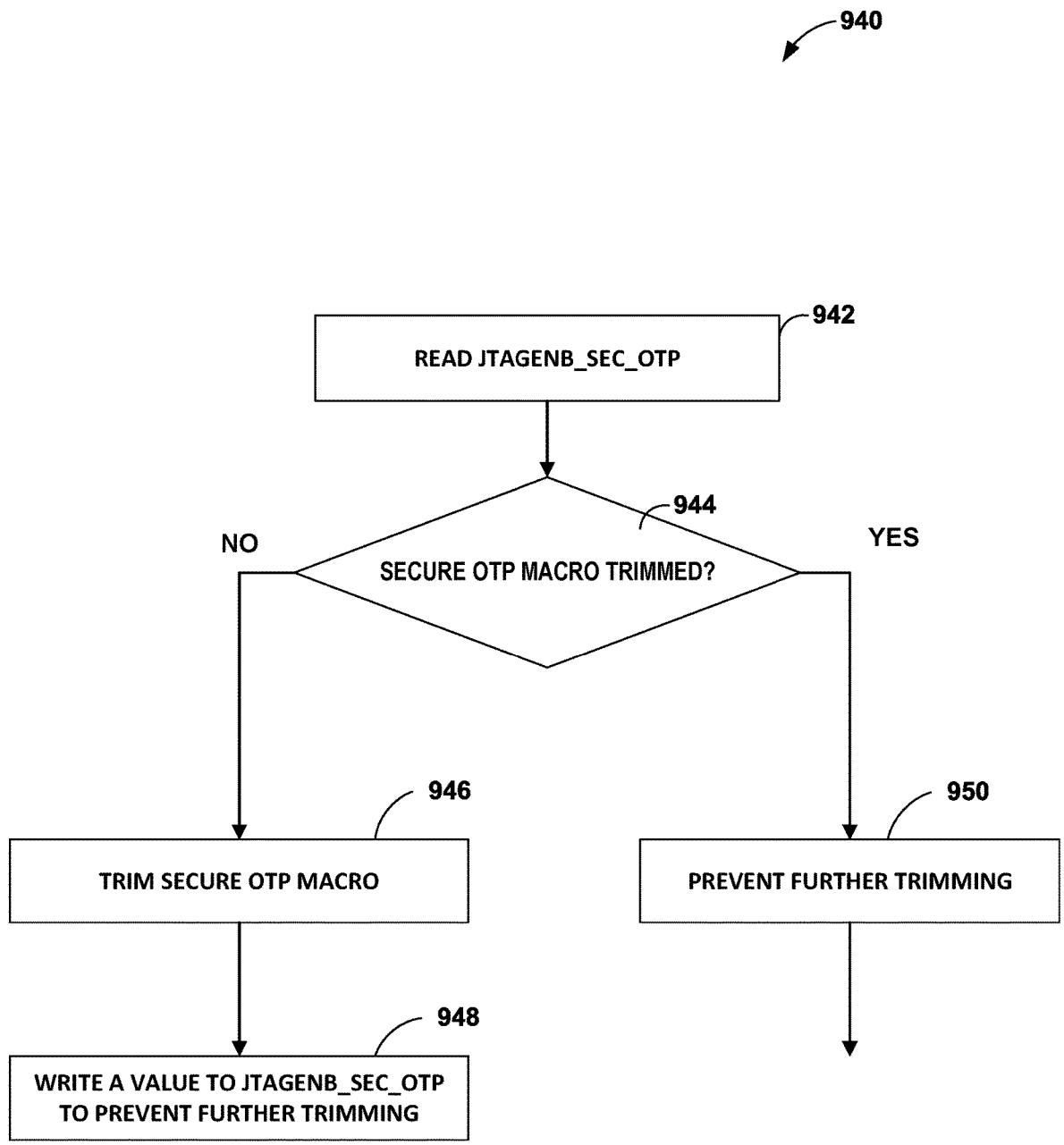
FIG. 11 is a flowchart illustrating another example process for detecting whether a secure OTP macro has been trimmed, in accordance with aspects of this disclosure.

FIG. 11 is a flowchart illustrating another example process for detecting whether a secure OTP macro has been trimmed, in accordance with aspects of this disclosure. In the example process 940 shown in FIG. 11, a JTAGENB_SEC_OTP bit (or an extra field or a 32b pre-defined pattern) in a non-secure section of OTP macro 600 is read [942]. If the JTAGENB_SEC_OTP bit or word indicates [at 944] that the OTP macro 600 has been trimmed, prevent further trimming by, for instance, by blocking the JTAG path for subsequent trimming attempts [950]. If, however, the JTAGENB_SEC_OTP bit or word indicates [at 944] that the OTP macro 600 has not been trimmed, trim the secure OTP macro and write a value to JTAGENB_SEC_OTP to prevent subsequent trimming attempts [948].

Controlling Access to OTP Macros Via Cryptographic Challenge-Response Authentication In yet another example approach, security controller 212 uses a cryptographic approach wherein a global secret (e.g., an AES key) or a public key is integrated into SoC RTL, and is only used for DFT unlock for OTP trimming at tester time. The tester provides a signed message that is verified by security controller 212. Upon successful verification of the signed message, security controller 212 allows access to DFT ports for trimming or calibration. An advantage to this approach is that the approach is cryptographically secure and is not tied to any unique requirements/properties of the OTP macros 600 (such as vendor specific requirements or properties).

Figure 12:
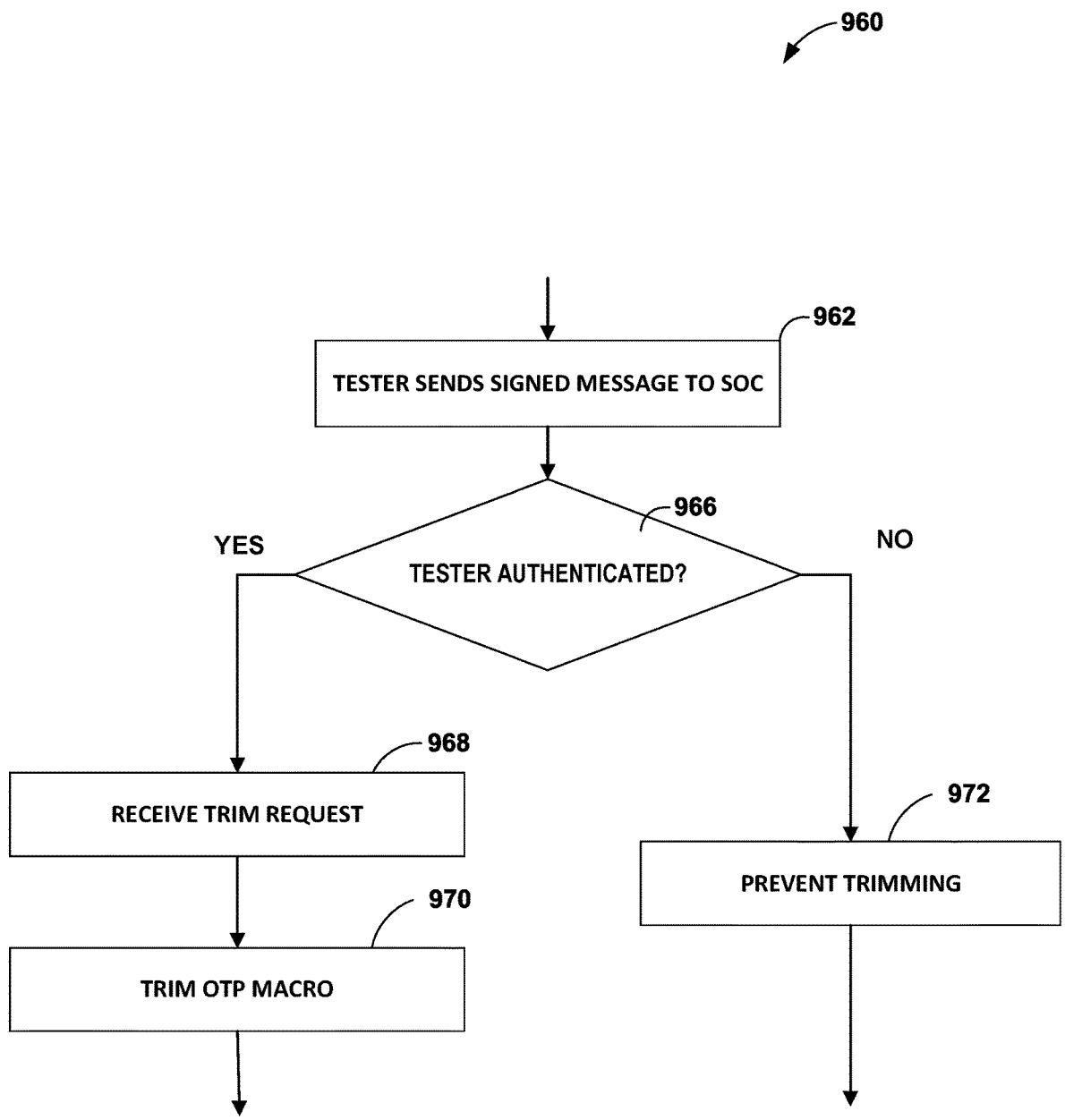
FIG. 12 is a flowchart illustrating an example process for trimming an OTP macro, in accordance with aspects of this disclosure.

FIG. 12 is a flowchart illustrating an example process for trimming an OTP macro, in accordance with aspects of this disclosure. In the example process 960 shown in FIG. 12, the tester provides a signed message [962]. Security controller 212 verifies the signed message and, if authenticated, security controller 212 receives a trim request from the tester and trims the OTP macro accordingly [970]. If the tester cannot be authenticated, security controller 212 prevents trimming of OTP macro 600 by the tester [972].

In another example approach, security controller 212 uses a challenge/response cryptographic approach wherein a global secret (e.g., an AES key) or a public key is integrated into SoC RTL, and is only used for DFT unlock for OTP trimming at tester time. The tester provides a signed message that is verified by security controller 212 to provide access to DFT ports for trimming or calibration. To eliminate the scope of replay attacks, a true random number generator (TRNG) (that does not require any trimming) generated entropy vector provides a challenge that the tester signs to produce the response. Again, an advantage to this approach is that the approach is cryptographically secure and is not tied to any unique requirements/properties of a particular vendor's OTP macros 600.

Figure 13:
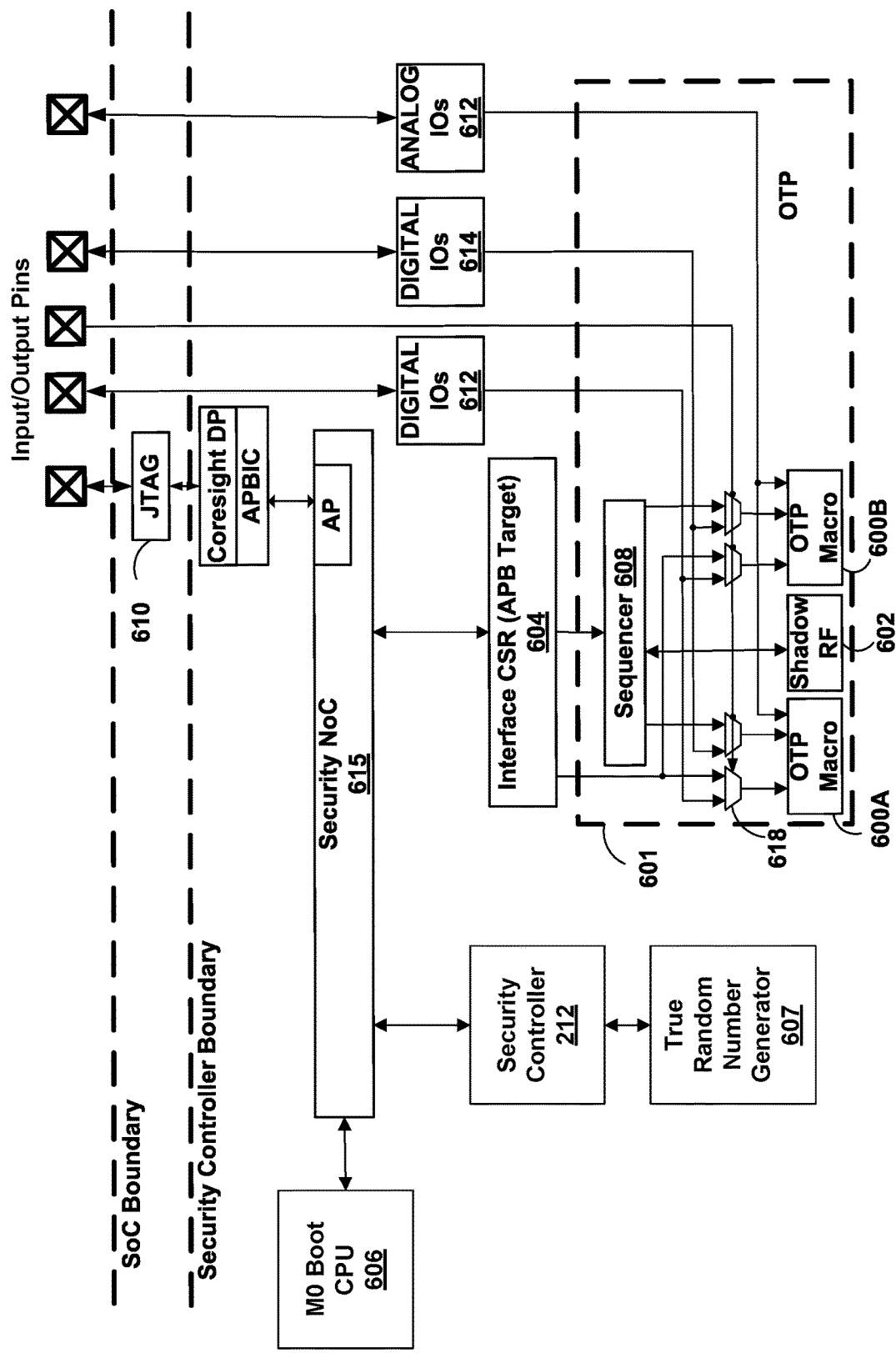
FIG. 13 is a block diagram illustrating another example of an OTP memory that may be integrated within the HMD of FIG. 5 to prevent unwanted access to OTP memory, in accordance with the techniques of the disclosure.

FIG. 13 is a block diagram illustrating another example of an OTP memory 350 that may be integrated within HMD 112 of FIG. 5 to prevent unwanted access to OTP memory 350 in accordance with the techniques of the disclosure. In the example shown in FIG. 13, OTP memory 350 includes two 32 kb OTP macros 600A and 600B (collectively the "OTP macros 600"), a 64 kb shadow register file 602, CSRs 604 with an APB interface to independently access the OTP macros 600 for reads/writes. In one example approach, OTP memory 350 includes logic (not shown) that enables seamless operation of the OTP macros 600 directly from the APB interface, to facilitate a more firmware driven OTP read/programming environment.

In one example approach, OTP memory 350 includes a security controller 212 that accesses a true random number generator 607. As noted above, true random number generator 607 may be used to generate an entropy vector that provides a challenge to the tester in response to the initial signed message. In one example approach, the firmware executes on the security controller 212.

In the example shown in FIG. 13, in test/debug mode, OTP macros 600 may be accessed from Joint Test Action Group (JTAG) interface 610, digital interfaces 612 and 614 and clock interface 616. As noted above, the non-deterministic latency over these varying access scenarios may, however, make it difficult to meet stringent OTP timing requirements. To address these requirements, sequencer 608 may orchestrate the toggling of delay sensitive signals to OTP macros 600 in read/program/calibration routines and manages data movement via the shadow register file 602.

As noted in the discussion of FIG. 6 above, the OTP macros 600 of FIG. 13 are located inside a secure OTP block 601. OTP block 601 is accessible by micro-controllers inside security controller 212, such as Boot MCU 606. JTAG interface 610 connects to the OTP block 601 but, in some approaches, this path may be disabled by the Boot MCU 606 in advanced life-cycle states when the chip is in production. In one such approach, Boot MCU 606 blocks JTAG access through Network on Chip (NoC) 615 by blocking the "NoC port" with a NOC firewall. NoC firewalls are programmable checkpoints that are controlled by security controller MCU's to grant or deny access between various SoC IPs. If a direct access pin is available (as required by certain products), Boot MCU 606 will also selectively block that path by controlling the multiplexers 618 at an analog input/output (IO) 612 of the OTP macro 600 as shown in FIG. 13.

Figure 14:
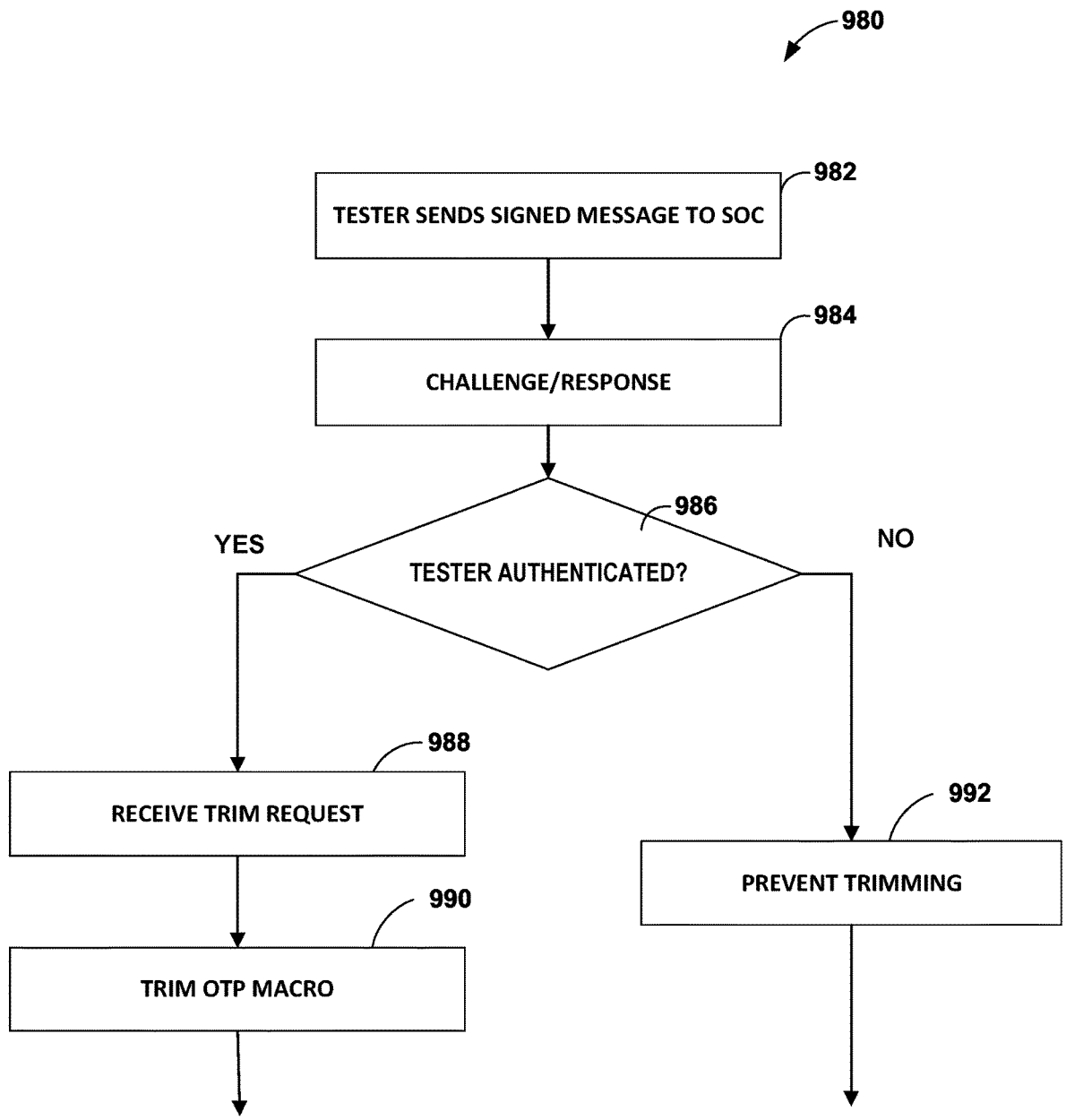
FIG. 14 is a flowchart illustrating another example process for trimming an OTP macro, in accordance with aspects of this disclosure.

FIG. 14 is a flowchart illustrating another example process 980 for trimming an OTP macro, in accordance with aspects of this disclosure. In the example shown in FIG. 14, the tester provides a signed message [982]. Security controller 212 verifies the signed message, generates an entropy vector and provides a challenge to the tester based on the entropy vector. The tester signs the challenge to produce a response that is verified by security controller 212 [984].

Once authenticated, SOC 2 receives a trim request from the tester and trims the OTP macro accordingly [990]. If the tester cannot be authenticated, security controller 212 prevents trimming of OTP macro 600 by the tester [992].

Processes 700, 900, 920, 940 960 and 980 as described above may be used separately or in combination. For instance, process 960 or process 980 may be used to prevent unauthorized testers from manipulating an OTP macro 600, while process 920 or process 940 may be used to detect if an OTP macro 600 has not yet been trimmed. And either process 700 or process 900 may be used to prevent unwanted access or manipulation of an OTP macro 600 during normal (i.e., non-test) modes of operation. Such combinations of processes strengthen the protections on OTP macros 600.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, fixed function circuitry, programmable circuitry, whether alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers

What is claimed is:

1. A system on a chip (SoC) integrated circuit comprising:
a Network on Chip (NoC);
a one-time programmable (OTP) memory;
a security controller in communication with the NoC and connected to the OTP memory; and
a memory having instructions that, when executed by the security controller:
  allow access to the OTP memory to permit an authorized trimming of the OTP memory during an initialization phase to compensate processing differences between integrated circuits,
  adjust an OTP life-cycle vector in response to the authorized trimming of the OTP memory during the initialization phase, wherein the OTP life-cycle vector stores and manages life-cycle information that specifies a current life-cycle state of the OTP memory, wherein the OTP life-cycle vector comprises a first and second OTP life-cycle vector, wherein the OTP memory comprises a first and second OTP macro, and wherein the adjusting of the OTP life-cycle vector comprises operations to adjust the first OTP life-cycle vector in response to the authorized trimming of the first OTP macro and to adjust the second OTP life-cycle vector in response to the authorized trimming of the second OTP macro,
  detect if the OTP memory has been trimmed based on the adjusted OTP life-cycle vector, and
  in response to detecting the OTP memory has been trimmed, prevent access to the OTP memory outside of the initialization phase, wherein the instructions include instructions that, when executed by the security controller, cause the security controller to instruct a NoC firewall of the NoC to deny access to the trimmed OTP memory by blocking a NoC port.

2. The SoC integrated circuit of claim 1, wherein the instructions for preventing access to the OTP memory outside of the initialization phase further include instructions that, when executed by the security controller, cause the security controller to prevent execution of requests by unauthorized testers to access OTP memory.

3. The SoC integrated circuit of claim 1, wherein instructions that, when executed by the security controller, cause the security controller to detect if the OTP memory has been trimmed include instructions that, when executed by the security controller, cause the security controller to determine whether the OTP memory has been trimmed by determining if a hamming weight of the OTP life-cycle vector is below a threshold.

4. The SoC integrated circuit of claim 1, wherein the instructions that, when executed by the security controller, cause the security controller to detect if the OTP memory has been trimmed include instructions that, when executed by the security controller, cause the security controller to determine whether the OTP memory has been trimmed by running one or more OTP memory tests at boot to determine if the OTP memory was trimmed.

5. The SoC integrated circuit of claim 1, wherein the OTP memory includes a secure OTP memory and an unsecured OTP memory, and
wherein the instructions that, when executed by the security controller, cause the security controller to detect if the OTP memory has been trimmed include instructions that, when executed by the security controller, cause the security controller to determine whether the secure section OTP memory has been trimmed, wherein the instructions to determine whether the secure section OTP memory has been trimmed include instructions for gating secure OTP memory access with non-secure OTP memory bits.

6. The SoC integrated circuit of claim 1, wherein the security processor is further configured to prevent access to the OTP memory outside of the initialization phase by cryptographically locking a design for test (DFT) interface to OTP memory.

7. The SoC integrated circuit of claim 1, wherein the security controller is further configured to prevent access to the OTP memory outside of the initialization phase by blocking Joint Test Action Group (JTAG) access to the OTP memory with the NoC firewall of the NoC.

8. An artificial reality device, comprising:
an application engine; and
a system on a chip (SoC) integrated circuit connected to the application engine, wherein the SoC integrated circuit includes:
   a Network on Chip (NoC);
   a one-time programmable (OTP) memory;
   a security controller in communication with the NoC and connected to the OTP memory; and
   a memory having instructions that, when executed by the security controller:
      allow access to the OTP memory to permit an authorized trimming of the OTP memory during an initialization phase to compensate processing differences between integrated circuits,
      adjust an OTP life-cycle vector in response to the authorized trimming of the OTP memory during the initialization phase, wherein the OTP life-cycle vector stores and manages life-cycle information that specifies a current life-cycle state of the OTP memory, wherein the OTP life-cycle vector comprises a first and second OTP life-cycle vector, wherein the OTP memory comprises a first and second OTP macro, and wherein the adjusting of the OTP life-cycle vector comprises operations to adjust the first OTP life-cycle vector in response to the authorized trimming of the first OTP macro and to adjust the second OTP life-cycle vector in response to the authorized trimming of the second OTP macro,
      detect if the OTP memory has been trimmed based on the adjusted OTP life-cycle vector, and
      in response to detecting the OTP memory has been trimmed, prevent access to the OTP memory outside of the initialization phase, wherein the instructions include instructions that, when executed by the security controller, cause the security controller to instruct a NOC firewall of the NoC to deny access to the trimmed OTP memory by blocking a NoC port.

9. The artificial reality device of claim 8, wherein the security controller is further configured to prevent access to the OTP memory outside of the initialization phase by blocking Joint Test Action Group (JTAG) access to the OTP memory with NoC firewall of the NoC.

10. The artificial reality device of claim 8, wherein the security controller is further configured to prevent access to the OTP memory outside of the initialization phase by determining if the OTP memory has been trimmed, wherein determining whether the OTP memory has been trimmed includes determining if a hamming weight of the OTP life-cycle vector is below a threshold.

11. The artificial reality device of claim 8, wherein the security controller is further configured to prevent access to the OTP memory outside of the initialization phase by determining if the OTP memory has been trimmed, wherein determining whether the OTP memory has been trimmed includes running one or more OTP memory tests at boot to determine if the OTP memory was trimmed.

12. The artificial reality device of claim 8, wherein the OTP memory includes a secure OTP memory and an unsecured OTP memory, and
wherein the instructions that, when executed by the security controller, cause the security controller to detect if the OTP memory has been trimmed include instructions that, when executed by the security controller, cause the security controller to determine whether a secure section OTP memory has been trimmed, wherein the instructions to determine whether a secure section OTP memory has been trimmed include instructions for gating secure OTP memory access with non-secure OTP memory bits.

13. The artificial reality device of claim 8, wherein the security controller is further configured to prevent access to the OTP memory outside of the initialization phase by cryptographically locking a design for test (DFT) interface to OTP memory.

14. An artificial reality system, comprising a head mounted display (HMD); and
a peripheral device communicatively coupled to the HMD;
wherein the HMD includes:
   a first application engine; and
   an HMD system on a first chip (SoC) integrated circuit connected to the first application engine, wherein the HMD SoC integrated circuit includes:
      a first Network on Chip (NoC);
      a first one-time programmable (OTP) memory;
      a first security controller in communication with the first NoC and connected to the first OTP memory; and
      a first memory having instructions that, when executed by the first security controller,
         allow access to the first OTP memory to permit an authorized trimming of the first OTP memory during a first initialization phase to compensate processing differences between integrated circuits,
         adjust a first OTP life-cycle vector in response to the authorized trimming of the first OTP memory during the initialization phase, wherein the first OTP life-cycle vector stores and manages life-cycle information that specifies a current life-cycle state of the first OTP memory, wherein the first OTP life-cycle vector comprises a primary and secondary OTP life-cycle vector, wherein the OTP memory comprises a primary and secondary OTP macro, and wherein the adjusting of the OTP life-cycle vector comprises operations to adjust the primary OTP life-cycle vector in response to the authorized trimming of the primary OTP macro and to adjust the secondary OTP life-cycle vector in response to the authorized trimming of the secondary OTP macro,
         detect if the first OTP memory has been trimmed based on the adjusted first OTP life-cycle vector, and
         in response to detecting the first OTP memory has been trimmed, prevent access to the first OTP memory outside of the first initialization phase, wherein the instructions include instructions that, when executed by the first security controller, cause the first security controller to instruct a first NoC firewall of the first NoC to deny access to the trimmed first OTP memory by blocking a first NoC port; and
wherein the peripheral device includes:
   a second application engine; and
   a peripheral device system on a second SOC integrated circuit connected to the second application engine, wherein the peripheral device SoC integrated circuit includes:
      a second Network on Chip (NoC);

a second one-time programmable (OTP) memory;
a second security controller in communication with the second NoC and connected to the second OTP memory; and
a second memory having instructions that, when executed by the second security controller,
allow access to the second OTP memory to permit an authorized trimming of the second OTP memory during the second initialization phase to compensate processing differences between integrated circuits, adjust a second OTP life-cycle vector in response to the authorized trimming of the second OTP memory during the initialization phase,
wherein the second OTP life-cycle vector stores and manages life-cycle information that specifies a current life-cycle state of the second OTP memory,
detect if the second OTP memory has been trimmed based on the adjusted second OTP life-cycle vector, and
in response to detecting the second OTP memory has been trimmed, prevent access to the second OTP memory outside of the second initialization phase, wherein the instructions include instructions that, when executed by the second security controller, cause the second security controller to instruct a second NoC firewall of the second NoC to deny access to the trimmed second OTP memory by blocking a second NoC port.

15. The artificial reality system of claim 14, wherein the first or second security controller of the first or second SoC integrated circuit is further configured to prevent access to the first or second OTP memory outside of the first or second initialization phase, respectively, by blocking Joint Test Action Group (JTAG) access to the first or second OTP memory with the first or second NoC firewall of the first or second NoC, respectively.

16. The artificial reality system of claim 14, wherein the first or second security controller of the first or second SoC integrated circuit is further configured to prevent access to the first or second OTP memory outside of the first or second initialization phase, respectively, by determining if the first or second OTP memory has been trimmed, wherein determining whether the first or second OTP memory has been trimmed includes determining if a hamming weight of the first or second OTP life-cycle vector is below a threshold.

17. The artificial reality system of claim 14, wherein the first or second security controller of the first or second SoC integrated circuit is further configured to prevent access to the first or second OTP memory outside of the first or second initialization phase, respectively, by determining if the first or second OTP memory has been trimmed, wherein determining whether the first or second OTP memory has been trimmed includes running one or more OTP memory tests at boot to determine if the first or second OTP memory was trimmed.

18. The artificial reality system of claim 14, wherein the first or second OTP memory of the first or second SoC integrated circuit includes a secure OTP memory and an unsecured OTP memory, and
wherein the instructions that, when executed by the first or second security controller, cause the first or second security controller to detect if the first or second OTP memory, respectively, has been trimmed include instructions that, when executed by the first or second security controller, cause the first or second security controller to determine whether the secure section OTP memory has been trimmed, wherein the instructions to determine whether the secure section OTP memory has been trimmed include instructions for gating secure OTP memory access with non-secure OTP memory bits.

19. The artificial reality system of claim 14, wherein the first or second security controller is further configured to prevent access to the first or second OTP memory, respectively, by cryptographically locking a design for test (DFT) interface to the first or second OTP memory.

20. A method, comprising:
allowing, by a security controller of an integrated circuit, access to a one-time programmable (OTP) memory included in the integrated circuit to permit an authorized trimming of the OTP memory during an initialization phase to compensate processing differences between integrated circuits, wherein the integrated circuit includes a Network on Chip (NoC) in communication with the security controller and connected to the OTP memory;
adjusting an OTP life-cycle vector in response to the authorized trimming of the OTP memory during the initialization phase, wherein the OTP life-cycle vector stores and manages life-cycle information that specifies a current life-cycle state of the OTP memory, wherein the OTP life-cycle vector comprises a first and second OTP life-cycle vector, wherein the OTP memory comprises a first and second OTP macro, and wherein the adjusting of the OTP life-cycle vector comprises operations to adjust the first OTP life-cycle vector in response to the authorized trimming of the first OTP macro and to adjust the second OTP life-cycle vector in response to the authorized trimming of the second OTP macro;
detecting, by the security controller, if the OTP memory has been trimmed based on the adjusted OTP life-cycle vector; and
in response to detecting the OTP memory has been trimmed, preventing, by the security controller, access to the OTP memory outside of the initialization phase, wherein preventing access to the OTP memory comprises instructing a NoC firewall of the NoC to deny access to the trimmed OTP memory by blocking a NoC port.

21. The method of claim 20, wherein preventing, by the security controller, access to the OTP memory outside of the initialization phase further comprises generating an error.

* * * * *